United States Patent [19]
Yamamoto et al.

[11] Patent Number: 5,121,017
[45] Date of Patent: Jun. 9, 1992

[54] STEPPING MOTOR AND MANUFACTURING METHOD THEREOF

[75] Inventors: Takashi Yamamoto; Eiki Narimoto; Masutarou Katsu; Tetsuo Matsubara, all of Nagoya, Japan

[73] Assignee: Brother Kogyo Kabushiki Kaisha, Aichi, Japan

[21] Appl. No.: 692,711

[22] Filed: Apr. 29, 1991

[30] Foreign Application Priority Data

Apr. 27, 1990 [JP] Japan .................. 2-112332

[51] Int. Cl.⁵ .............. H02K 37/00; H02K 15/00
[52] U.S. Cl. .............. 310/49 R; 310/257; 310/43; 29/596
[58] Field of Search .......... 310/49 R, 254, 257, 310/154, 42, 43, 162; 29/596

[56] References Cited

U.S. PATENT DOCUMENTS

| | | | |
|---|---|---|---|
| 3,508,091 | 4/1970 | Kavanaugh | 310/49 R |
| 3,711,732 | 1/1973 | Gerber et al. | 310/162 |
| 4,193,703 | 3/1980 | Sakmann | 400/124 |
| 4,333,026 | 6/1982 | Bock et al. | 310/257 |
| 4,381,465 | 4/1983 | Renkl et al. | 310/49 R |
| 4,714,850 | 12/1987 | Akiba et al. | 310/49 R |
| 4,794,292 | 12/1988 | Torisawa | 310/49 R |
| 4,841,190 | 6/1989 | Matsushita et al. | 310/257 |
| 5,020,211 | 6/1991 | Nakagawa et al. | 29/596 |

FOREIGN PATENT DOCUMENTS

| | | | |
|---|---|---|---|
| 35-106352 | 7/1960 | Japan | 310/49 R |
| 1395742 | 5/1975 | United Kingdom | 310/40 R |

OTHER PUBLICATIONS

English Abstract for Japanese Pat. No. 60-106352.
Search Report issued to a corresponding British Patent Application No. 9109223.9.

*Primary Examiner*—Steven L. Stephan
*Assistant Examiner*—Matthew Nguyen
*Attorney, Agent, or Firm*—Kane, Dalsimer, Sullivan, Kurucz, Levy, Eisele and Richard

[57] ABSTRACT

A method of manufacturing a stator member for a stepping motor of the present invention comprises the steps of: placing a coil member on a mold; placing a yoke member on a mold with its teeth portions being inserted into a cylindrical hollow portion of the coil member from its one end, one surface of each of the teeth portions facing the mold being in contact with a surface of the mold; pressing the yoke member toward the coil member in a direction along the central shaft portion of the coil member so that a base plate portion of the yoke member may be brought into contact with a flange portion of the coil member; and providing hardenable material in a space enclosed by the surface of the mold and surfaces of the coil member and the yoke member, to thereby integrally uniting the coil member and the yoke member into one stator member.

21 Claims, 18 Drawing Sheets

FIG. 12(a)
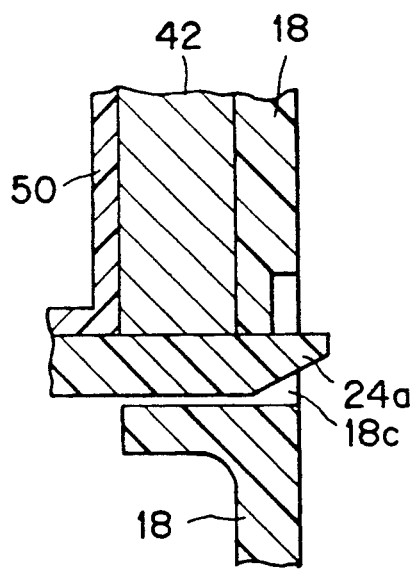
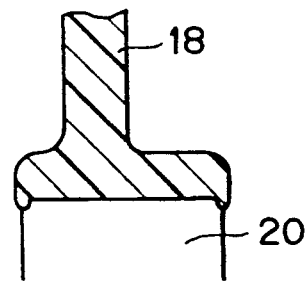
FIG. 12(a)
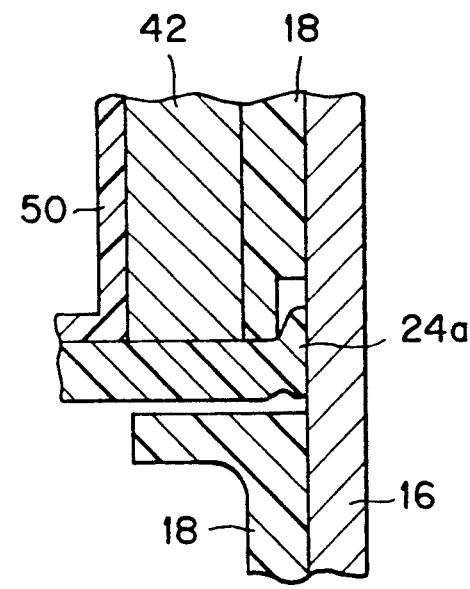
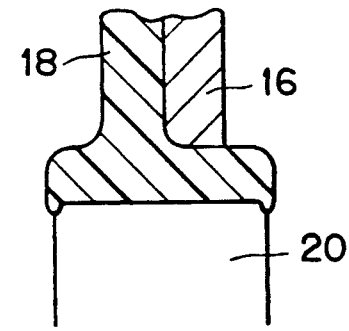

FIG. 15
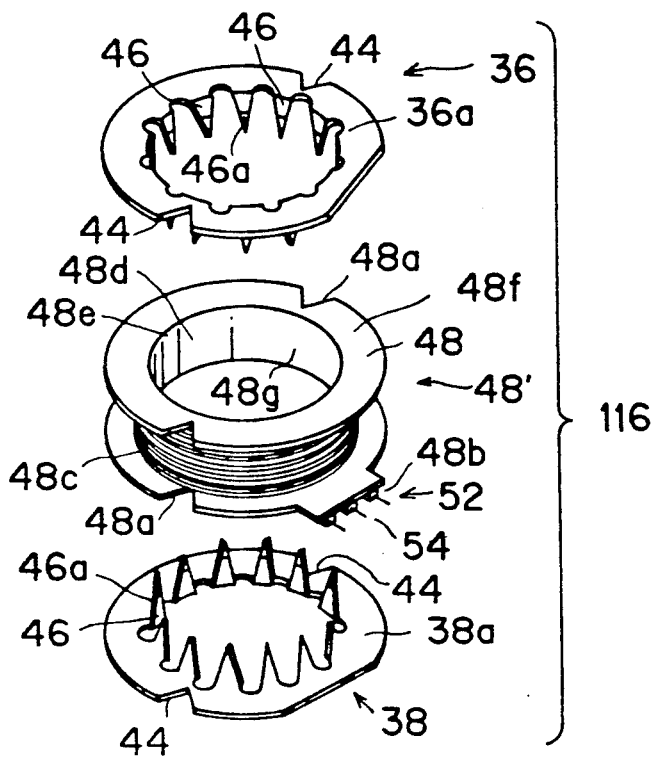
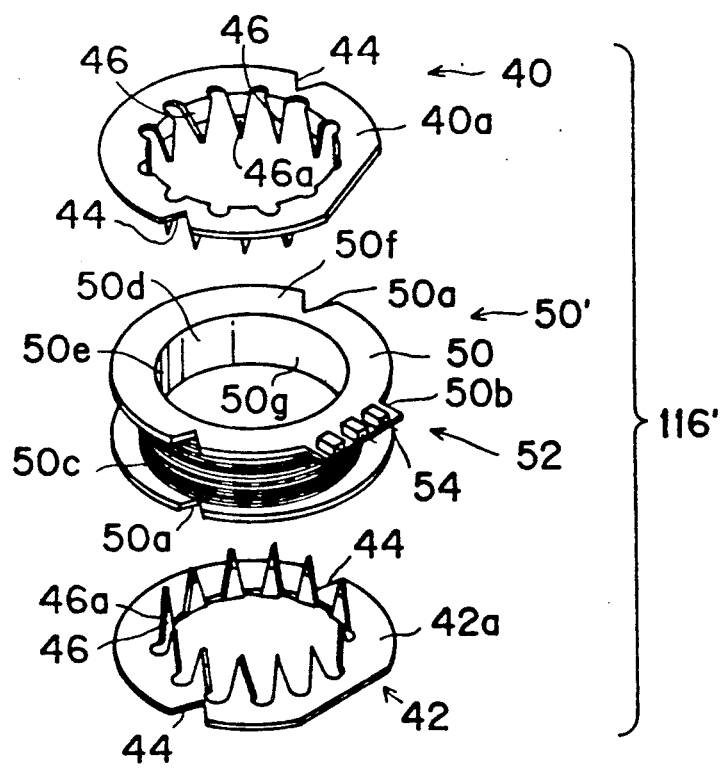

STEPPING MOTOR AND MANUFACTURING METHOD THEREOF

BACKGROUND OF THE INVENTION

The present invention relates to a stepping motor and a method for producing the stepping motor.

There is well known a stepping motor of a type having a stator with a plurality of coils stacked one on another along a shaft of the motor. For example, such the stepping motor is disclosed in a Japanese Unexamined Patent Application Publication No.63-39443. Each of the coils comprises a bobbin in a ring shape having a central shaft around which wires are wound, the central shaft having therein a hollow portion. A pair of yoke members having a plurality of teeth-shaped magnetic poles are fixedly secured to each of the coils such that the yoke members sandwich the coil therebetween. Thus, the one of the yoke members, the coil and the other one of yoke members are disposed in the motor along the motor shaft in this order. The yoke members are fixedly secured to the coil such that the teeth-shaped magnetic poles of the yoke members are inserted into the hollow portion of the central shaft of the coil so that each two adjacent teeth poles of one yoke member sandwich corresponding each tooth pole of the other yoke member.

A rotor is mounted in a space formed by the hollow portions of the central shafts of the bobbins stacked one on another. The rotor has a shaft and a permanent magnet fixedly secured thereto. The permanent magnet has a cylindrical shape with its axis extending along the shaft. The permanent magnet has a circular cross section on a plane perpendicular to its axis, and the circular cross section has a radius slightly smaller than that of the hollow portions of the central shafts of the bobbins.

The stator is produced in such a manner that the plurality of coils and the yoke members are assembled into one body and are wholly coated with resin so that the coils and the yoke members are integrally united into a stator. Therefore, the precision of the shape of thus produced stator and the positional accuracy of the members constituting the stator depend on the precisions of the shapes of the bobbins and the yoke members. However, the accuracies for processings of the yoke members and the coils are different from each other, so that the dimensional presicions of them are different from each other. It is very difficult to assemble, in high accuracy, the coils and the yoke members having different dimensional precisions from each other. Thus, a number of motors with their dimensional precisions lower than a desired precision are erroneously manufactured in the manufacturing procedure. As a result, the motor is made expensive. In order to solve the problem, it may be possible to process the bobbins of the coils and the yoke members with high accuracy. However, in such a case, the motor is still made expensive.

SUMMARY OF THE INVENTION

In order to overcome the above noted defects, an object of the present invention is to provide a method for manufacturing a high quality stepping motor with a low cost, by decreasing the possibility of erroneously producing stepping motors having precisions lower than the required precision.

This and other objects may be attained by providing a method of manufacturing a stator member for a stepping motor, comprising the steps of: placing a coil member on a mold, the coil member having a central shaft portion and a pair of flange portions extending from both ends of the central shaft portion, the coil member having wirings wound around the central shaft portion between the pair of flange portions, the central shaft portion having an inner peripheral wall defining a cylindrical hollow portion; placing at least one yoke member on a mold, the yoke member including an annular base plate portion and a plurality of teeth-shaped magnetic pole portions extending upright from the base plate portion, the teeth portions being inserted into the cylindrical hollow portion of the coil member from its one end, one surface of each of the teeth portions facing the mold being in contact with a surface of the mold; pressing the yoke member toward the coil member in a direction along the central shaft portion of the coil member so that the base plate portion of the yoke member may be brought into contact with one flange portion of the coil member; and providing hardenable material in a space enclosed by the surface of the mold and surfaces of the coil member and the yoke member, to thereby integrally uniting the coil member and the yoke member into one stator member.

According to the method of the present invention, the pair of yoke members are fitted into the hollow portion of the central shaft of the coil member. Then, the coil member is mounted on the mold. At that time, the base plate portions of the yoke members are apart from the flange portions of the coil, due to differences existing between the dimensions of the bobbin of the coil and the yoke members. Then, the coil and the yoke members are compressed in their axial direction, so that the flange portions of the coil member come into intimate contact with the base plate portions of the yoke members. Thus intimately contacted flange portions and the base plate portions form sealing means to be used in the resin injection molding process. That is, hard resin in melted state is provided into a space which is formed between the mold and thus formed sealing means. As a result, the coil and the yoke members are integrally formed into the stator through the hardened resin.

In the method of the present invention, the coil and the yoke members are compressed, as described above. Therefore, even if there exists slight differences between the dimensions of the bobbin of the coil and the yoke members, the coil and the yoke members are slightly deformed through the compression process, so that the dimensional differences are neglected. Furthermore, the dimension of the obtained stator in its axial direction is determined by the position where the compression means is stopped. Therefore, the dimension of the stator can be increased, simply by determining, with high accuracy, the position where the compression means is stopped.

According to another aspect, a stator for a stepping motor of the present invention comprises: a coil member having a central shaft portion having an axis and a pair of flange portions extending from both ends of the central shaft portion, the coil member having wirings wound around the central shaft portion between the pair of flange portions, the central shaft portion having an inner peripheral wall defining a cylindrical hollow portion; a pair of yoke members, each of the yoke members including an annular base plate portion and a plurality of teeth-shaped magnetic pole portions extending upright from the base plate portion, the teeth portions being inserted into the hollow portion of the central shaft of the coil member from its both ends to thereby extend along the inner peripheral wall thereof, the base plate portions being in contact with the flange portions of said coil member, the teeth portions of the pair of yoke members being arranged along the inner peripheral wall of the coil such that each two adjacent teeth portions of selected one of the pair of yoke members sandwich each corresponding one tooth portion of the other one of the pair of yoke members; and a hardened material structure filled in a space formed by a cylindrical surface defined by surfaces of the teeth portions facing the axis of the coil and surfaces of the coil member and the yoke members.

BRIEF DESCRIPTION OF THE DRAWINGS

In the accompanying drawings:

FIGS. 1 through 17 shows a stepping motor of a first embodiment of the present invention, in which FIG. 1 illustrates the state where the hook portions formed on the protrusions of the terminal holders engage with each other;

FIG. 2 is a cross-sectional side view of a stepping motor of the embodiment;

FIG. 3 is a front view of the stepping motor;

FIG. 4 is a perspective view of the stator and the rotor, a part of which being cut off;

FIG. 5 shows a shape of a lower bearing supporting plate;

FIG. 6 illustrates the manner how both end plates are joined to a side plate through a spot welding performance;

FIG. 7 is a perspective view illustrating the manner how a coil member and yoke members are assembled;

FIG. 8 illustrates a shape of a stepped portion formed on each teeth-shaped magnetic pole;

FIG. 9 illustrates a shape of the protrusion of the terminal holder;

FIG. 10 illustrates the manner how the yoke members, the coils, and the upper bearing are integrally united into one body;

FIG. 11 illustrates the manner how the yoke members and the coil member are accurately positioned in their circumferential directions;

FIGS. 12(a) and 12(b) are sectional views showing the state how the lower bearing supporting plate is fixedly secured to the stator;

FIG. 13 is a perspective view illustrating the state how the pole teeth are stretched out at their bent portions in the case where stepped portions are not formed with the pole teeth;

FIG. 15 illustrates how the coil members and the yoke members are assembled into the one stator;

FIG. 16 illustrates how wirings are wound around a bobbin to form a coil member;

FIG. 17 illustrates how the magnetic pole teeth are arranged;

FIGS. 19 through 21 shows a fourth embodiment of the present invention, in which FIG. 19 is a cross-sectional view of a stepping motor of the fourth embodiment;

FIG. 20 shows a shape of a bottom end plate; and

FIG. 21 is a front view of the stepping motor of the embodiment.

DESCRIPTION OF THE PREFERRED EMBODIMENTS

A preferred first embodiment of the invention will now be described with reference to the accompanying drawings.

Hereinafter, the rightward and leftward directions in FIG. 2 will be referred to downward and upward directions of the motor, and the upward and downward directions in FIG. 2 will be referred to forward and rearward directions of the motor.

Figures 1, 2:
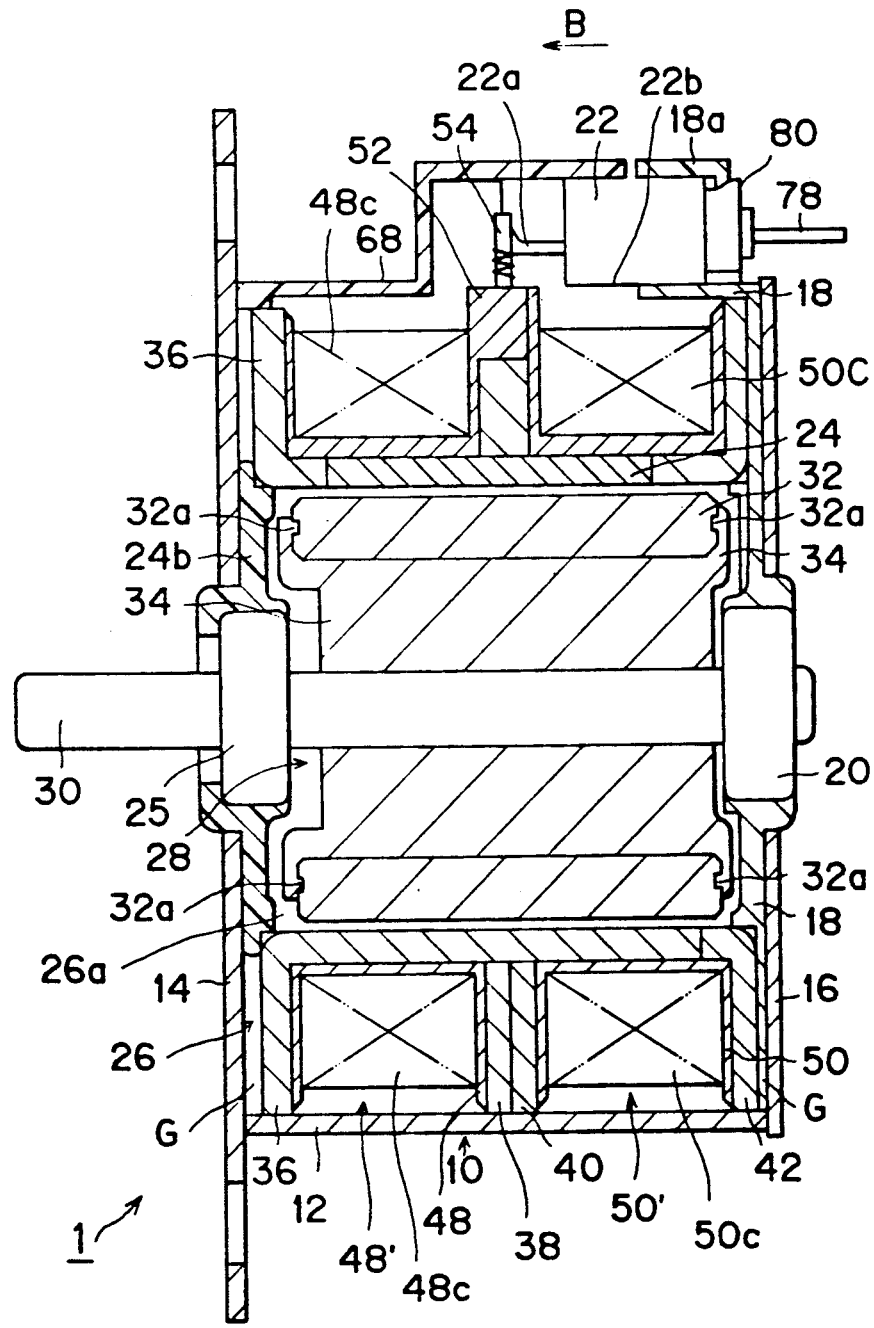
Figure 3:
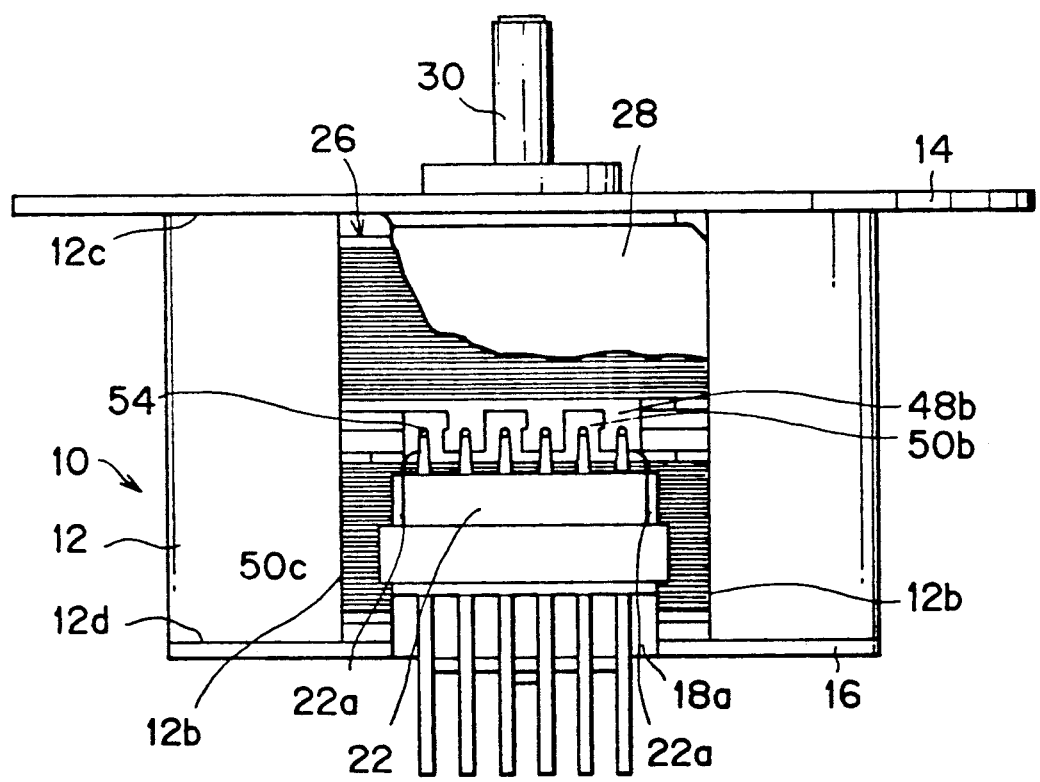
Figure 4:
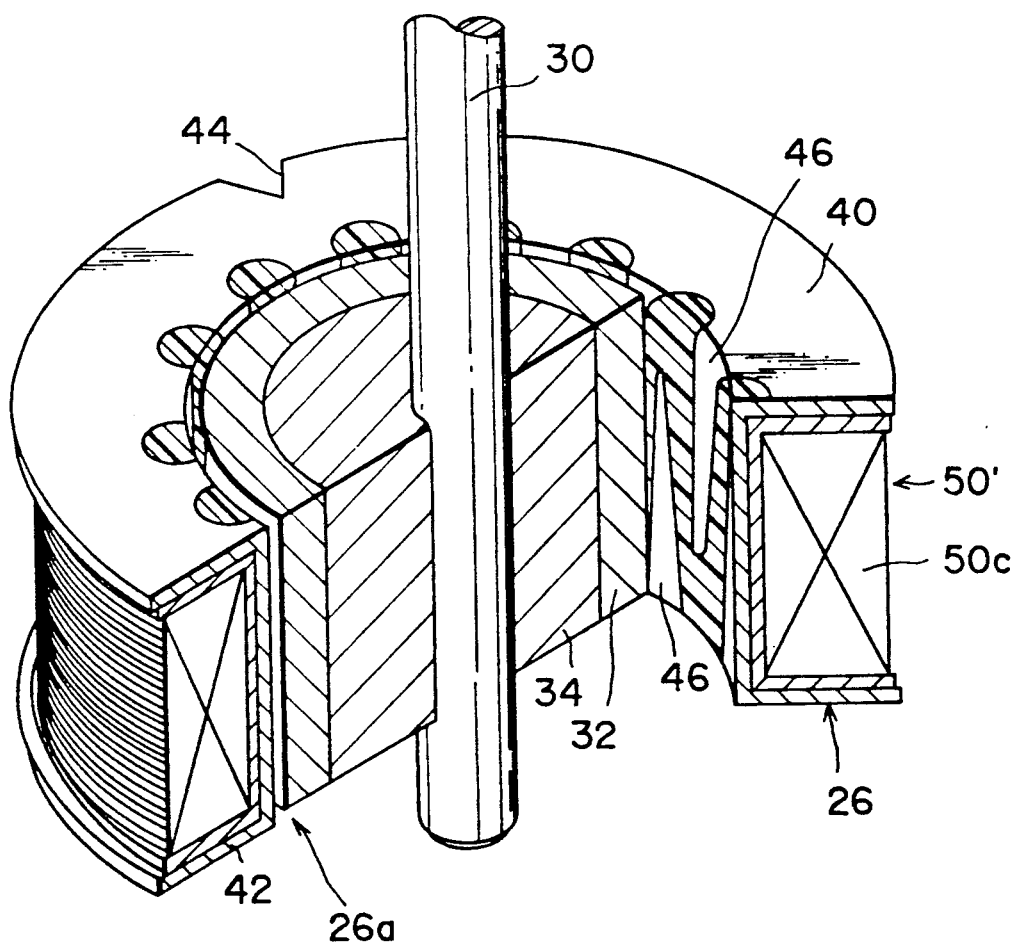

As shown in FIGS. 2 through 4, a motor 1 of the embodiment of the present invention includes a stator 26, a rotor 28 having a motor shaft 30, upper and lower bearings 25 and 20 for supporting the motor shaft 30, upper bearing supporting member 24b, lower bearing supporting plate 18, a motor casing 10, and a cover member 68. Furthermore, a housing connector 22 is connected to the stator 26.

The motor casing 10 includes an upper end plate 14, a lower end plate 16 and a side plate 12 to thereby form a cylindrically-shaped hollow portion for enclosing the stator 26 and the rotor 28. The side plate 12 extends in a direction parallel to the motor shaft 30 of the rotor. The side plate 12 has a C-shaped cross section in a plane perpendicular to the motor shaft. In other words, as shown in FIG. 3, the side plate 12 has left and right end side portions 12b and 12b at a front portion of the motor, so that the stator 26 is not covered with the side plate 12 at its front portion to thereby be connectable with the housing connector 22. The side plate 12 further includes an upper end side portion 12c and a lower end side portion 12d, to which the upper end plate 14 and the lower end plate 16 are fixedly secured through spot welding operation.

Figure 5:
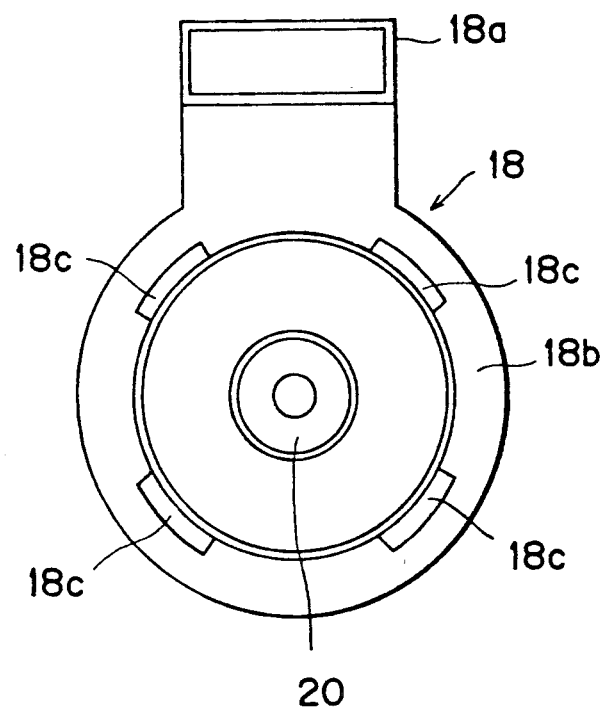

The lower bearing supporting plate 18 made of hardened resin is provided on the lower end plate 16 inside the motor casing 10. As shown in FIG. 5, the lower bearing supporting plate 18 has a circular plate portion 18b and a rectangular parallelpiped portion 18a formed by four walls extending in a direction parallel to the motor shaft 30. The rectangular parallelpiped portion 18a has openings at its upper and lower ends so that the housing connector 22 may be inserted into the portion 18a through the lower end opening to be moved along the walls upwardly. Thus, the rectangular parallelpiped portion 18a receives therein the housing connector 22, as shown in FIG. 2, to retain the housing connector therein. The lower bearing 20 is fixedly secured to the circular plate portion 18b at its center portion. The circular plate portion 18b is formed with four through-holes 18c around its center portion, with which engaged are four protrusions 24a of the stator 26, so that the plate 18 is fixedly secured to the stator, as shown in FIG. 12. The plate 18 is produced easily through insert molding operation, in which the lower bearing 20 is placed inside the mold and then resin in melted state is provided inside the mold. When the resin is hardened, the circular plate portion 18b and the rectangular parallelpiped portion 18a are integrally formed with each other, with the lower bearing 20 being held in the circular plate portion. The circular plate portion 18b has a predetermined thickness, so that there is formed a gap G of the thickness between a lower surface of the stator 26 and the lower end plate 16, as shown in FIG. 2.

The upper bearing supporting member 24b is mounted on the upper end plate 14 inside the motor casing 10. The upper bearing supporting member 24b is made of hardened resin such as PBT (polybutylene terephthalate), and is integrally formed with the stator 26. That is, the upper bearing supporting member 24b is formed from resin which is used for integrally uniting yoke members and coils into one stator body 26. An upper bearing 25 is fixedly secured on the upper bearing supporting member 24b at its center portion. The upper bearing supporting member 24b has a predetermined thickess, so that there is formed a gap G of the thickness between a lower surface of the upper end plate 14 and an upper surface of the stator 26.

A motor shaft 30 is rotatably supported in the motor casing 10 via the lower and upper bearings 20 and 25. A permanent magnet 32 is provided on the motor shaft 30, at its portion between the bearings 20 and 25. The permanent magnet 32 and the motor shaft 30 constitute the rotor 28. As shown in FIG. 4, the permanent magnet 32 is of a cylindrical shape with its axis extending along the motor shaft 30 and having a concentric circular cross section on a plane perpendicular to its axis. The permanent magnet 32 includes a plurality of magnetic poles arranged around the motor shaft. A space formed between the motor shaft 30 and the permanent magnet 32 having such a concentric cross section is filled with hardened resin 34, so that the permanent magnet 32 is fixedly secured to the motor shaft 30. The permanent magnet 32 has an annular grooves 32a on its upper and lower end surfaces which are also filled with the resin 34. Therefore, it becomes possible to prevent the motor shaft 30 from shifting from the axis of the permanent magnet 32 when the resin 34 is hardened to be shrinked. As a result, it becomes possible to prevent the rotor 28 from contacting the stator 26.

In the inside of the motor casing 10, there is further mounted a stator 26 having a teeth-shaped magnetic poles 46 which confront the permanent magnet 32 arranged on an outer peripheral side surface of the rotor 28. As shown in FIGS. 2 and 15, the stator 26 is made of a pair of single unit members 116 and 116' stacked one on the other along the motor shaft 30. The single unit member 116 comprises a pair of yoke members 36 and 38 and a coil member 48' including a coil bobbin 48 on which wirings 48c are provided. The other single unit member 116' comprises a pair of yoke members 40 and 42 and another coil member 50' including a coil bobbin 50 on which wirings 50c are provided. The coil bobbin 48 (50) includes a central shaft member 48e (50e) with its axis extending along the motor shaft 30 and having an inner peripheral wall 48g (50g) defining a central hollow portion 48d (50d). The bobbin 48 (50) further includes a pair of flange portions 48f (50f) extending from the central shaft member in a direction perpendicular to its axis. The pair of flange portions and an outer peripheral wall of the central shaft member form an U-shaped groove. The wirings 48c (50c) are wound around the central shaft member inside the U-shaped groove. The shaft member and the flange portions are integrally formed with each other into a single bobbin from resin such as polypropylene.

Each of the yoke members (36, 38, 40 and 42) have annular-shaped base plate portion (36a, 38a, 40a and 42a) and a plurality of teeth portions (46) protruded upright from the base portion. The teeth portions 46 are disposed angularly on the annular-shaped base portion at a predetermined interval. Thus shaped yoke member is produced, as follows: A plate approximately in a circular shape is cut, so that a annular-shaped plate with a plurality of teeth-shaped portions are formed. Then, thus formed teeth-shaped portions are bent to extend vertically from the annular-shaped plate, as a result of which the yoke member is obtained.

The pair of yoke members 36 and 38 (40 and 42) are disposed to sandwich the coil 48' (50') therebetween in such a manner that the teeth portions 46 of the yoke members 36 and 38 (40 and 42) are inserted into the central hollow portion 48d (50d) of the bobbin 48 (50). As a result, the yoke members and the coil member are assembled into the one single unit member 116 (116').

The stator 26 is produced in such a manner that thus produced single unit members 116 and 116' are stacked one on the other in a direction along the motor shaft 30 and are subjected to resin injection molding treatment. That is, spaces formed among the yoke members and the bobbins of the pair of single unit members are filled with hard resin, so that the single unit members 116 and 116' are integrally united with each other via the hardened resin to form the stator 26. The upper bearing supporting member 24b is formed from the hardened resin simultaneously with the resin injection molding treatment.

The teeth portions 46 of the yoke members serve as magnetic poles of the stator 26 confronting the plural magnet poles of the rotor 28 to cooperate therewith. The operation of the magnetic poles 46 of the stator 26 is well known, and is disclosed in a Japanese Unexamined Patent Application Publication No.63-39443, for example. Therefore, explanation of such the operation of the magnetic poles is neglected herein.

The structure of the stator 26 will be described in more detail below.

Figure 8:
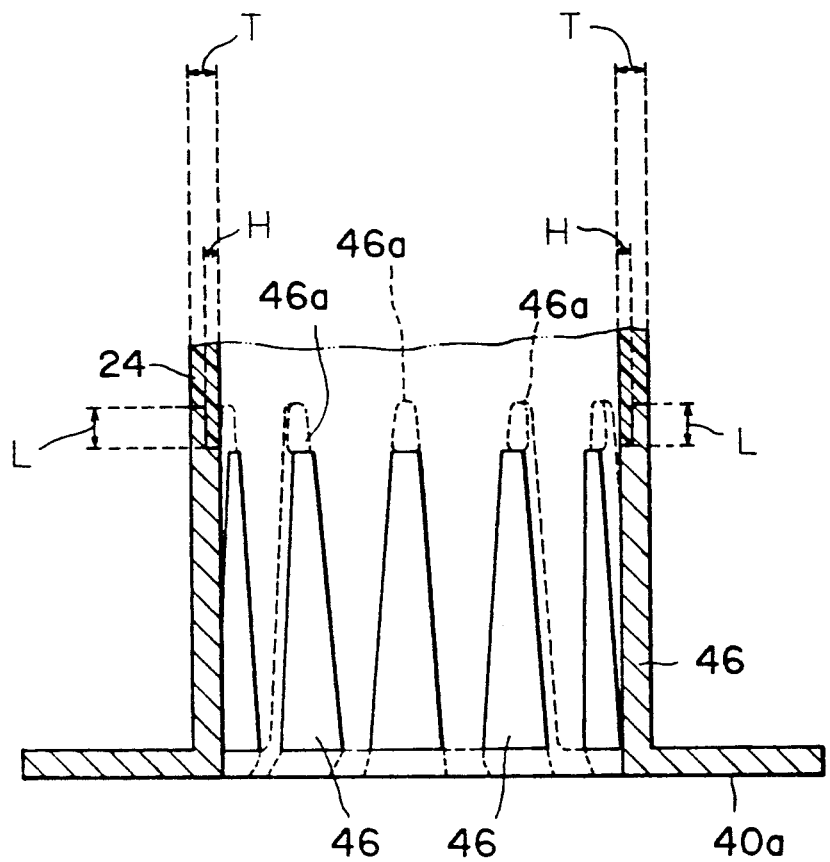
Figure 17:
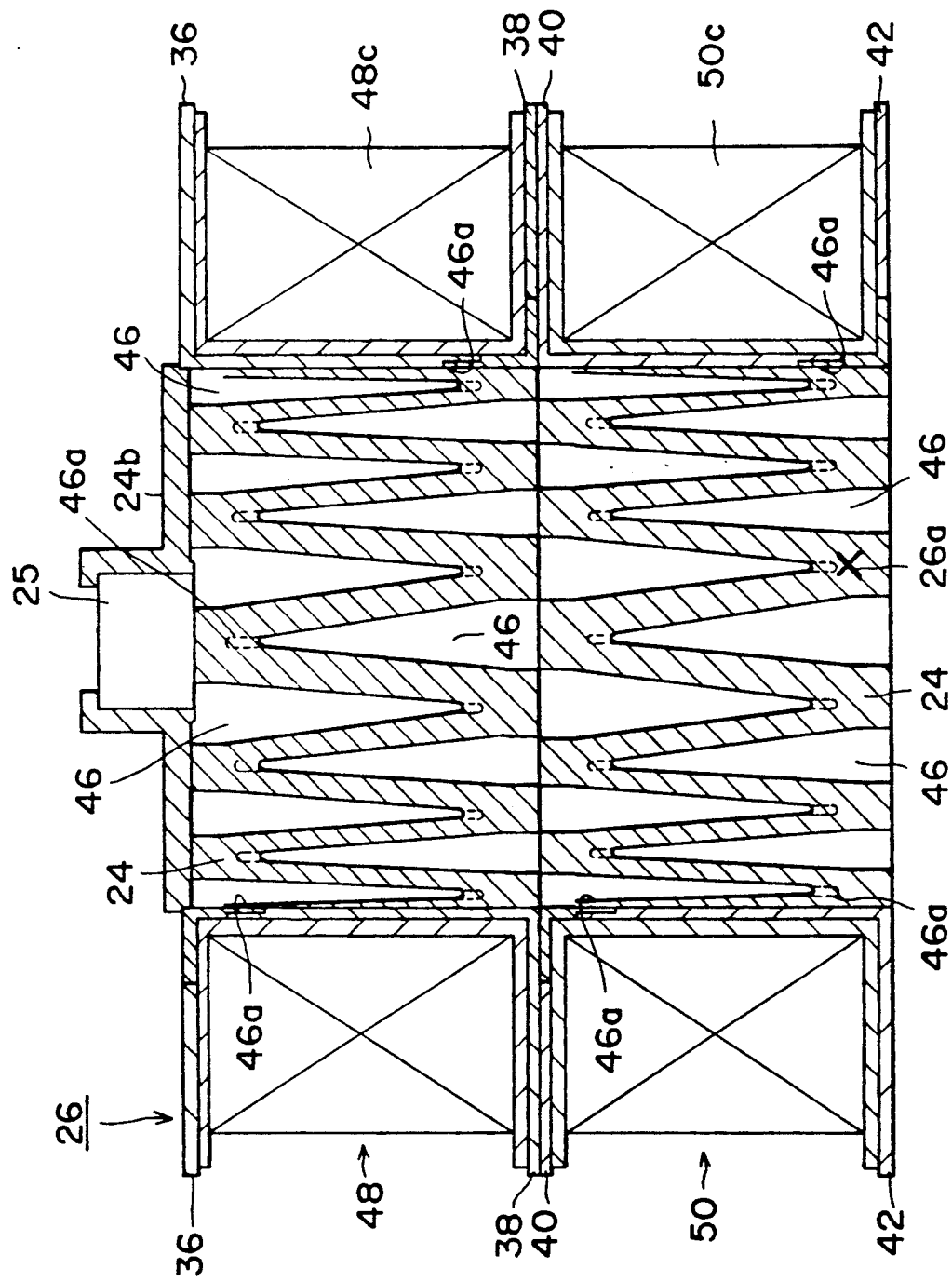

Each of the teeth-shaped magnetic poles 46 of the yoke members has a stepped portion 46a at its tip end, as shown in FIGS. 2, 8 and 17. The stepped portion 46a is formed on each tooth-shaped pole 46 on its side facing the peripheral side surface of the rotor 28. The stepped portion 46a has a length L of about 0.3 mm and a step height H of in the range of about 0.5 to 0.8 mm, in the case where a thickness T of the teeth-shaped portion 46 is about 1.0 mm, as shown in FIG. 8. The stepped portion 46a is formed through press treatment process.

Figure 7:
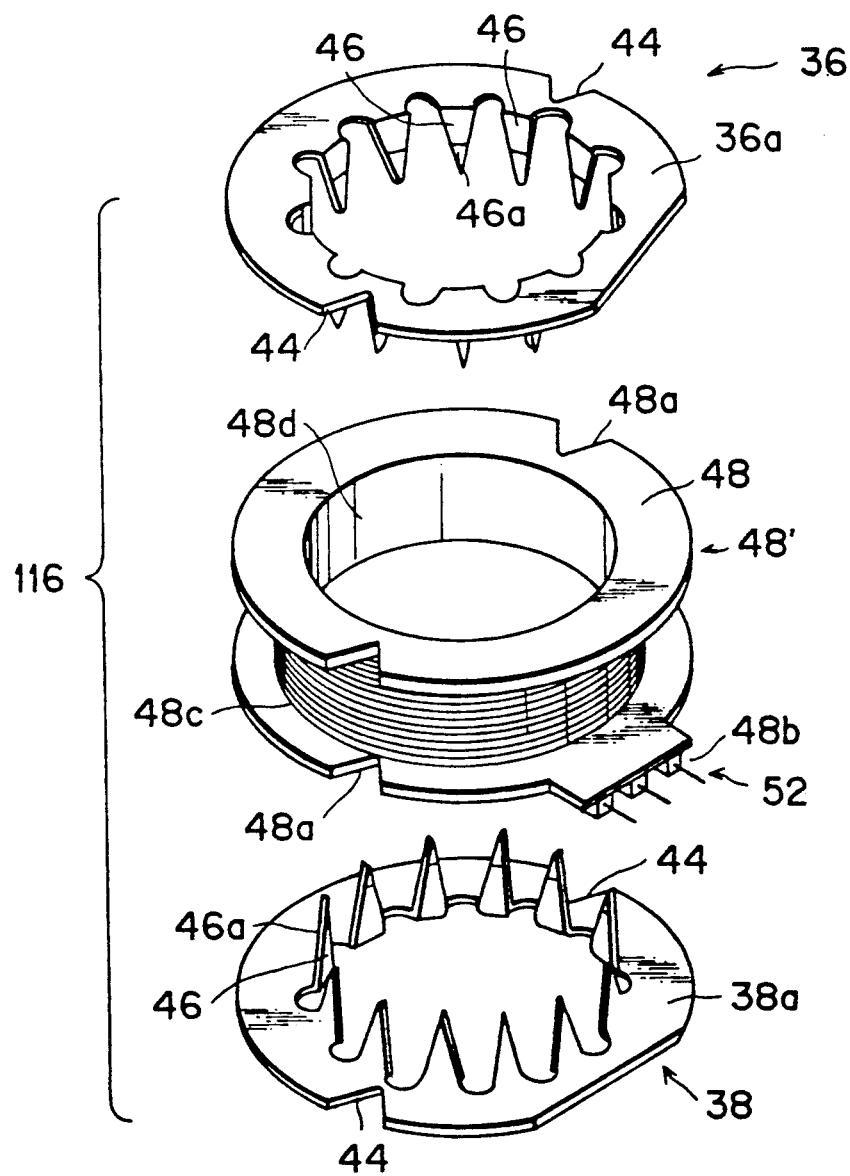

A pair of V-shaped cut portions 44 are formed on each of the annular-shaped base plates 36a, 38a, 40a and 42a of the yoke members such that the pair of V-shaped cut portions may be disposed on one line passing through a center of the annular-shaped member. FIG. 7 only shows the V-shaped cut portions 44 of the yoke members 36 and 38. Also in both the flange portions of each of the coil bobbins 48 and 50, there are formed V-shaped cut portions 48a and 50a which are of the same shape as those of the V-shaped cut portions 44 of the yoke members. When the teeth-shaped members 46 of the yoke members 36 and 38 (40 and 42) are inserted into the central hollow portion 48d (50d) of the bobbin 48 (50), the V-shaped cut portions 44 of the yoke members 36 and 38 (40 and 42) and the V-shaped cut portions 48a (50a) of the coil bobbin 48 (50) are positioned to confront each other. As a result, the yoke members are placed accurately on the bobbin so that the teeth-shaped poles 46 are arranged along the inner peripheral wall 48g (50g) of the shaft of the bobbin 48 (50) in such a manner that each two adjacent ones of the teeth-shaped poles 46 of the yoke member 36 (40) sandwich therebetween corresponding each one of the teeth-shaped poles of the yoke member 38 (42) and that each two adjacent ones of the teeth-shaped poles 46 of the yoke member 38 (42) sandwich therebetween corresponding each one of the teeth-shaped poles of the yoke member 36 (40), as shown in FIGS. 4 and 17.

Figure 9:
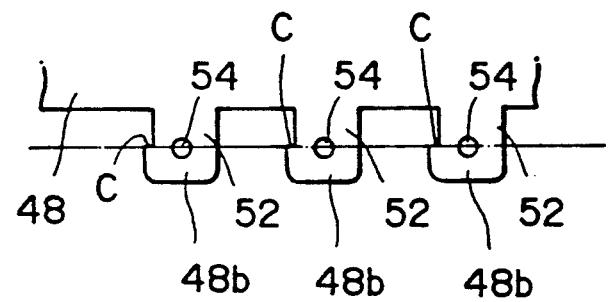

Each of the coil bobbins 48 and 50 is further formed with a terminal pin holding member 52 on one of the pair of flange portions, as shown in FIG. 15. The terminal pin holding member 52 is formed on one of the flange portions at such a position as apart from the pair of V-shaped cut portions 48a and 48a (50a and 50a) with a distance almost the same as each other. Three protrusions 48b (50b) are formed on the terminal pin holding member 52. The protrusions 48b (50b) are protruded from a surface of the flange portion which does not confront the other flange portion. On each of the protrusions, a terminal pin 54 is provided to extend in a horizontal direction perpendicular to the motor shaft. The protrusions 48b and 50b on the bobbins 48 and 50 are arranged such that each two ajacent ones of the protrusions 48b (50b) sandwich corresponding each one of the protrusions 50b (48b), as shown in FIGS. 3 and 15. As shown in FIGS. 1 and 9, each of the protrusions 50b on the bobbin 50 has a hook portion c at its right side, and each of the protrusions 48b on the bobbin 48 has also a hook portion c at its left side. On each of the bobbins, the hook portions c are formed on one line crossing all the terminal pins 54 formed on the bobbin. Therefore, each of the hook portions c of the protrusions 48b is engaged with corresponding one of the hook portions c of the protrusions 50b, so that the terminal pins 54 of the bobbin 50 are arranged on the same line with the terminal pins 54 of the bobbin 48. The terminal pins are thus arranged on one line with the same interval as that of the connector pins on the housing connector member 22 which is held in the retaining portion 18a, as shown in FIG. 3.

Figure 16:
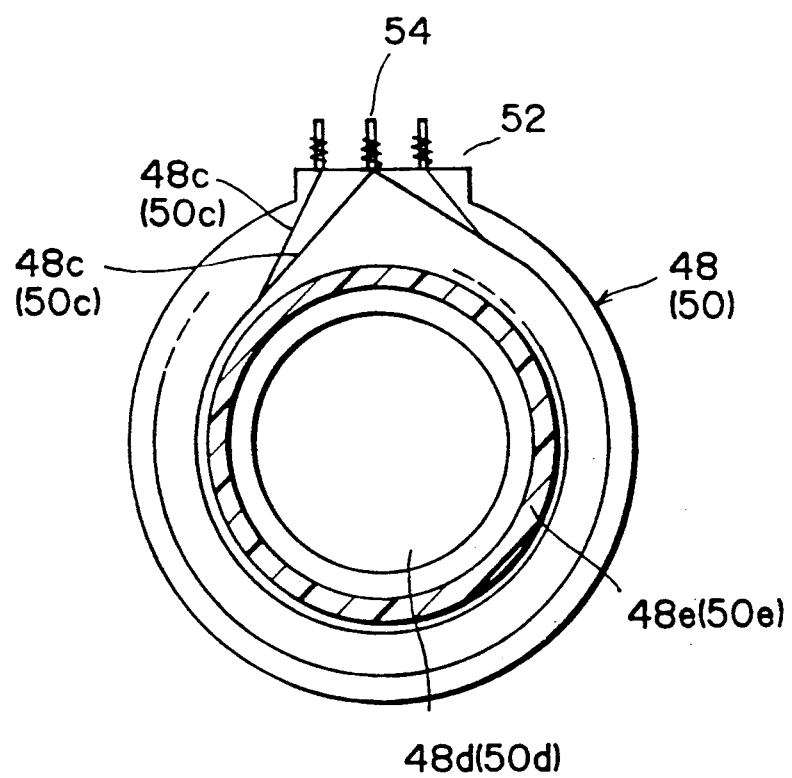

Windings 48c (50c) are provided on the coil bobbin 48 (50) such that the wirings are wound around its shaft member 48e (50e) at a portion between its flange portions 48f (50f), as a result of which the coil member 48' (50') is formed. Each of the widings 48c and 50c comprises two enamel wires. As shown in FIG. 16, the wirings 48c (50c) are provided on the bobbin 48 (50), as follows: First, one end portions of the wirings 48c (50c) are held on two of the terminal pins 54 on the holder member 52 of the bobbin 48 (50). In such a state, the wirings 48c (50c) are wound around the bobbin 48 (50) several times, so that several turns of wirings are provided on the bobbin. Then, the other end portions of the wirings 48c (50c) are held on other two of the terminal pins 54. The both end portions of the wirings held on the three terminal pins 54 are subjected to soldering treatment.

The mechanism how the yoke members and the coils having the above-described structures are assembled will be described below.

Since the holder members 52 have the above-described structure, the coils 48' and 50' including the holder members 52 can be obtained by producing a pair of coils of the same structure. That is, as shown in FIG. 15, one of the coils 48' is engaged with the yoke members 36 and 38 to form the one single unit member 116. The other one of the coils 50' is placed upside down and then is engaged with the yoke members 40 and 42 to form the other single unit member 116'. Then, thus formed single unit member 116 is mounted on the single unit member 116'. Thus, the single unit members 116 and 116' are placed such that the protrusions 48b and 50b on the holder members 52 of the coils face each other. Then, the single unit members are pressed toward each other, so that the hook portions c of the projections 48b and 50b are elastically deformed to be engaged with each other. As described already, the terminal pins 54 and the hook portions c of the projections 48b (50b) of the bobbin 48 (50) are arranged on the same line, as designated by one dot and one chain line in FIG. 9. Therefore, when the hook portions c on the projections 48b and 50b are engaged with each other, all the terminal pins 54 of the bobbins 48 and 50 are placed on the same line, as shown in FIG. 1.

Using the above-described stator member assembling mechanism, the stator members are integrally united into a single stator member, as will be described below. The members are united into the stator through resin injection molding treatment.

Figure 10:
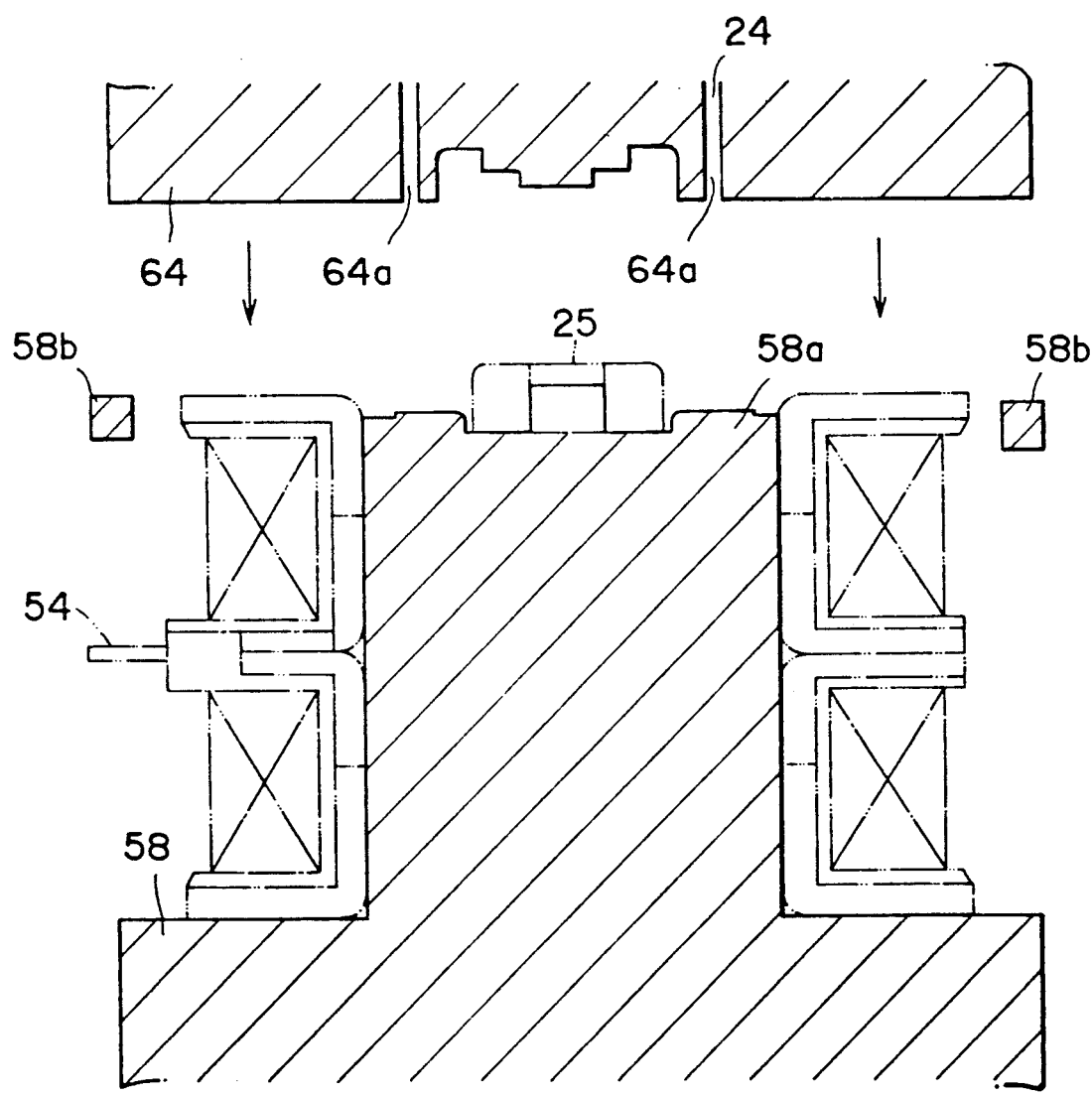
Figure 11:
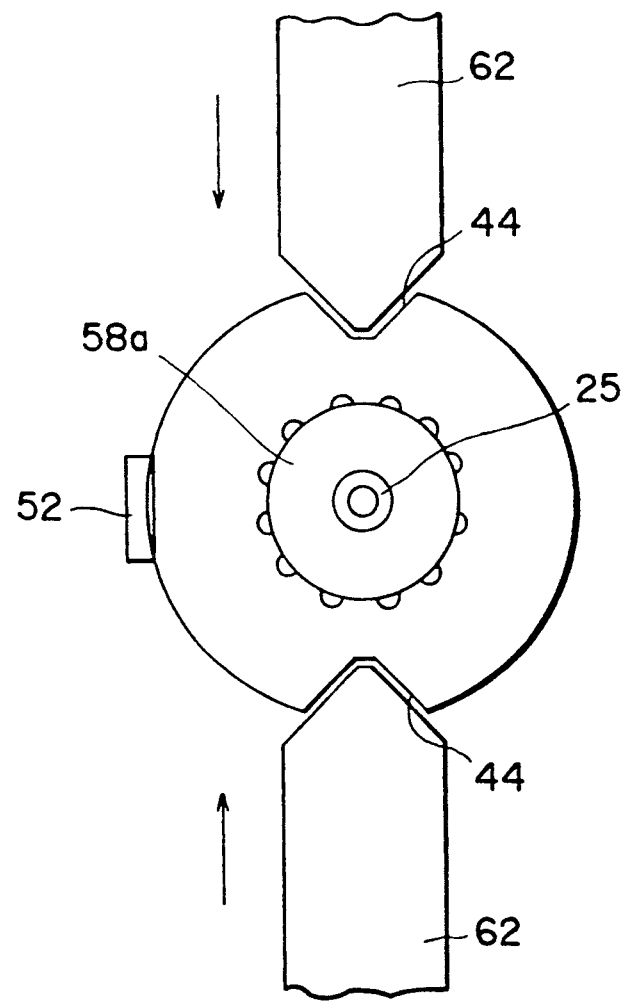

As shown in FIGS. 10 and 11, the resin injection molding apparatus includes a bottom mold 58 having a columnar portion 58a and a stopper portion 58b, an upper mold 64 having through-holes 64a for allowing resin in melted state to be injected into a space formed between the bottom and upper molds 58 and 64 and a pair of positioning members 62.

The yokes 36 and 38 are roughly engaged with the coil 48 to form the single unit member 116. The yokes 40 and 42 are roughly engaged with the coil 50 to form the single unit member 116'. The single unit members 116 and 116' are mounted on the bottom mold 58 such that the columnar portion 58a is inserted into the central hollow portion 48d and 50d of the single unit members. The diemeter of the columnar portion 58a agrees with a diameter of a cylindrical surface formed by surfaces of the teeth 46 facing the axis of the yoke. Therefore, the teeth-shaped magnetic poles 46 of the single unit members are in contact with the side peripheral surface of the columnar portion 58a. Thus, axes of both the single unit members 116 and 116' extend along the axis of the column 58a. The single unit members are mounted on the bottom mold 58 in such an order that the single unit member 116' is first mounted on the bottom mold 58 and the single unit member 116 is mounted on the single unit member 116', as shown in FIG. 15.

As shown in FIG. 11, each of the positioning members 62 has, at its tip end portion, a protrusion engageable with the V-shaped cut portions 44 of the yoke members and the V-shaped cut portions 48a and 50a of the coils. The positioning members are usually urged in directions toward the columnar portion 58a, but are moved away from the columnar portion by the use of a solenoid member (not shown in the drawing) during when the single unit members are being mounted on the mold. The single unit members are mounted on the mold in such a manner that the protrusions of the positioning members may be received by the V-shaped cut portions 44, 48a and 50a. During the time when the single unit members are thus being mounted on the mold, there are formed gaps approximately in a range of 0.1 to 0.2 mm between the surface of the protrusion of the positioning members and the side surfaces of the yoke members and of the coil flange portions at their V-shaped cut portions. Thus, the coils and the yoke members constituting the single unit members 116 and 116' are positioned roughly in their circumferential directions.

Then, the pair of positioning members 62 are moved toward the single unit members thus mounted on the mold, and are pressed toward them. In accordance with the movement of the positioning members, the side peripheral surfaces of the yoke base plate portions and of the coil flange portions in their V-shaped cut portions are slide on the side surfaces of the protruded portions of the positioning members. As a result, the yoke members and the coils are slightly rotated about the columnar portion, so that the yoke members and the coils are positioned accurately in their circumferential directions. That is, the single unit members 116 and 116' are mounted on the mold such that all the V-shaped cut portions formed on the yoke members and the coils face precisely one another.

Then, the upper bearing 25 is mounted on a top surface of the columner portion 58a, as shown in FIG. 10. After that, an upper mold 64 is moved downwardly until when the upper mold reaches a stopper 58b formed integrally with the bottom mold 58, so that the upper mold 64 and the bottom mold 58 compress the single unit members 116 and 116' along their axes, i.e., the axis of the columnar portion 58a.

Before such a compression is performed, since the yokes are roughly engaged with the coils, the base plate portions 36a, 38a, 40a and 42a of the yoke members are positioned apart from the flange portions 48f and 50f of the coil bobbins, due to differences existing between the dimensions of the bobbins and the yoke members. However, when the coils and the yoke members are compressed in their axial direction, the flange portions are brought into intimate contact with the base plate portions. Furthermore, the flange portions of the coils 48 and 50 facing each other are also brought into intimate contact with each other. Thus intimately contacted flange portions and the base plate portions form sealing means to be used in the resin injection molding process. That is, there is formed a sealing means for preventing the injected resin from pouring outside of the stator through its peripheral side surfaces.

According to the present invention, the pair of flange portions and the outer peripheral wall of the shaft portion of the coil bobbin form a U-shaped groove. The yoke member has an annular plate portion. Thus, both the flange portions and the annular plate portions have free ends, at their outer peripheral portions. Therefore, the flange portion and the annular portion can be elastically deformed with a large amount when the coils and the yoke members are compressed by the molds as described above. As a result, the flange portion can be certainly brought into intimate contact with the flange portion of the other bobbin and with the base plate portion of the yoke members.

As apparent from the above description, the positioning accuracies of the yoke members, the coils and the upper bearing constituting the stator 26 are determined due to the shape of the molds 58 and 64. That is, a height of the stator 26 to be obtained in the injection molding apparatus is thus determined due to a distance between an upper surface of the bottom mold 58 and an upper surface of the stopper 58b. Since the stopper 58b is formed integrally with the bottom mold 58, a precision of the distance between the stopper 58b and the bottom mold 58 can be made sufficiently high. Therefore, it is possible to make sufficiently high a precision of dimension of the stator 26 in a direction along its axis, i.e., along the motor shaft. The positional accuracy of the members constituting the stator is made sufficiently high in comparison with that obtained in the case where the members are positioned manually.

Furthermore, even if there exists slight differences between the dimensions of the coils and the yoke members, the coils and the yoke members are slightly deformed through the compression process, so that the dimensional differences are neglected.

It is noted, furthermore, that stress is ununiformly resigned inside the material of the coil bobbin. That is, the amount and the direction of the stress resigned inside an inner part of the flange portion contacted with the wirings are quite different from those of the stress resigned inside an outer part of the flange portion. Through the compression of the single unit members by the upper and bottom molds, also due to the difference of the residual stress, the flange portions are apt to be elastically deformed. Thus, the terminal holder members 52 on the bobbins 48 and 50 are urged toward each other, so that the hook portions c of the protrusions 48b and 50b are engaged with each other. Due to the engagement of the hook portions, all the terminal pins 54 are made to be arranged in one line, as described above.

Then, the hardening resin 24 in melted state is then injected through the injection holes 64a into the space formed between the upper and bottom molds and the sealing means constituted by the intimately contacted coil flange portions and the yoke base plates. The hardening resin 24 is hardened to thereby integrally unit the yoke members and the coils of both the single unit members 116 and 116' into the single stator 26. Thus formed stator 26 has a cylindrical shape having a central hollow portion 26a, as shown in FIGS. 2 and 4. Furthermore, since the hardening resin 24 is hardened in such a state where the terminal pins 54 are arranged in in-line, such a stator 26 as having the terminal pins 54 arranged in one line is obtained.

Through the above-described injection molding treatment, an upper bearing supporting member 24b is also formed from the hardened resin 24. The upper bearing supporting member 24b is formed integrally with the stator 26, and therefore the upper bearing 25 is fixedly secured to the stator 26 via the supporting member 24b. Furthermore, since the upper and bottom molds 64 and 58 have predetermined shapes and the stopper member 58b of the bottom mold 58 is positioned at a predetermined position, the upper bearing supporting member 24b has a predetermined amount of thickness.

Through the injection molding treatment, furthermore, four protrusions 24a of the hardened resin 24 are formed on the lower surface of the stator 26, since the bottom mold 58 has four recesses on its upper surface. One of the four protrusions 24a is shown in FIG. 12. The four protrusions 24a will be received in the four through-holes 18c formed on the lower bearing supporting plate 18, to thereby accurately position the plate 18 relative to the stator 26 when the plate is to be mounted on the stator. As shown in FIG. 12, each of the protrusions 24a has a slanted portion in its side facing in a direction toward the central hollow portion 26a. Furthermore, each of the protrusions 24a is formed on the lower surface of the stator 26 in such a position that one side of the protrution 24a facing the central hollow portion 26a will not contact the plate 18 but the other side of the protrusion 24a will abut against the plate 18 when the protrusion 24a is inserted into the through-hole 18c.

In the injection molding treatment, as described already, each of the teeth-portions 46a except for its stepped portion 46a is contacted with the columnar portion 58a of the bottom mold 58. Therefore, as shown in FIGS. 8 and 17, the hardening resin 24 is not provided on the surface of the portion of the tooth 46 which is contacted with the columnar portion 58a. The resin is provided on the surface of the stepped portion 46a facing the columnar portion and in a space between each two adjacent teeth-portions. Therefore, when the rotor is mounted inside the central hollow portion 26a of the stator 26, the surfaces of the teeth-portions 46 facing the rotor are covered with the hardened resin 24 only on the stepped portions 46a at their tip end portions. Thus resin-covered tip end portions 46a of the teeth 46 will serve as means for preventing the tip ends of the teeth portions 46 from being separated from the stator 26 to be directed toward the rotor 28, as will be described below.

When the yoke member is to be produced, as described already, a plate of almost circular shape is cut, so that a annular-shaped base plate with the teeth portions 46 are formed. Thus, the teeth 46 originally extend toward a center of the annular-shaped base plate member along the base plate. Then, the teeth 46 are bent at their base portions to stand upright from the base plate member. Therefore, after when the yoke member is thus produced, stress is resigned in the teeth 46 at their base portions where the teeth are bent. Due to the residual stress, the teeth 46 are liable to return back to their original states. That is, the teeth 46 are liable to be stretched out at their bent portions.

Figure 13:
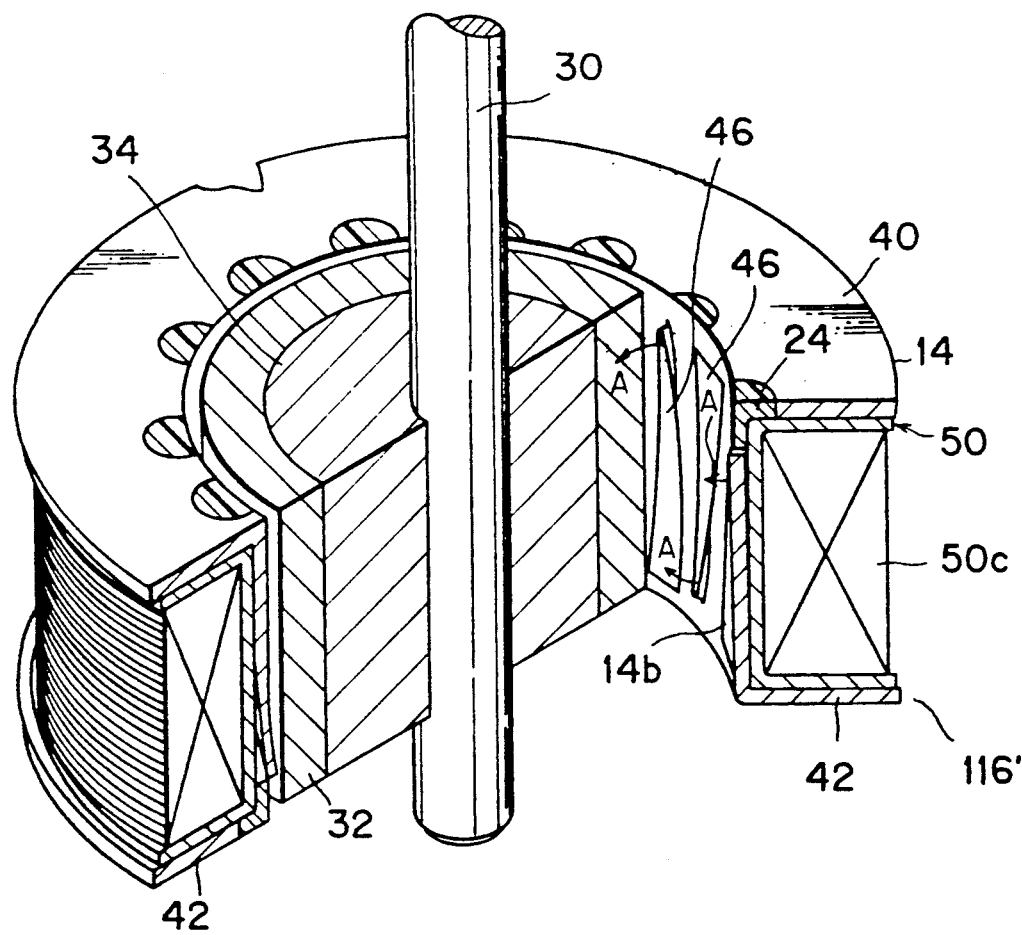

If the teeth 46 do not have such stepped portions 46a as of the present invention, as shown in FIG. 13, the surfaces of the teeth 46 facing the rotor 28 are not covered with the hardened resin at all, but the hardened resin is provided only in spaces between each two adjacent teeth. Therefore, the teeth 46 are not prevented from being returned back to their original states, so that the teeth 46 are liable to be stretched out at their bent portions due to the residual stress, as designated by arrows A in the drawing.

Furthermore, the hardened resin 24 provided in the spaces between each two adjacent teeth 46 is liable to be shrinked or swelled, due to its feature or due to heat generated while the motor is being energized. In such a case, if the surface of the tooth 46 is not covered with the hardened resin at all, it is impossible to prevent the tooth being stretched out at its bent portion. Furthermore, when the motor accidentally suffers shock from outside, it is impossible to prevent the tooth being stretched out at its bent portion, either.

If the teeth 46 are thus stretched out at their bent portions, as shown in FIG. 13, magnetic forces formed in a space between the rotor magnetic poles 32 and the stator magnetic poles 46 are unbalanced. As a result, it becomes impossible to accurately control the motor. Furthemore, in the case where the teeth 46 are stretched out at their bent portions and the tip end portions of the teeth contact the peripheral surface of the rotor 28, the rotor is unable to be rotated.

To the contrary, according to the present invention, the teeth 46 have the stepped portions 46a covered with the hardened resin, as shown in FIGS. 8 and 17. Therefore, it is possible to prevent the teeth from being stretched out at their bent portions, due to the residual stress, shrinkage or swell of the hardened resin or shock from outside.

In this case, the tooth is covered with the resin at its tip end portion which is most far from its base portion where the tooth is bent. The base portion serves as a support point for the lever-like tooth. In other words, in the present invention, the hardened resin applies force to the lever (tooth 46) at its position which is most far from its support position (base portion), in order to prevent the lever from rotating around its support position. Therefore, the hardened resin can prevent the lever from being rotated, with a very small amount of force. Thus, according to the present invention, even if the length L of the stepped portion 46a is not so large, the hardened resin provided on the stepped portion can certainly prevent the tooth 46 being stretched out at its bent portion.

After when the stator 26 is produced through the above-described resin injection molding treatment, the stator 26, the rotor 28, the lower bearing supporting plate 18, the side plate 12, and the both end plates 14 and 16 are assembled into the motor 1, as will be described below.

First, an upper portion of the motor shaft 30 of the rotor 28 is inserted into the hole of the upper bearing 25 which is provided on the bearing supporting portion 24b formed integrally with the stator 26. As a result, the rotor 28 is accommodated in the central hollow portion 26a of the stator 26. Then, the lower bearing supporting plate 18 is mounted on the lower surface of the stator 26, with a lower portion of the motor shaft 30 being inserted into the hole of the bearing 20 supported on the plate 18.

When the plate 18 is mounted on the stator 26, the protrusions 24a formed on a lower surface of the stator 26 are engaged with the through-holes 18c of the plate 18, as shown in FIG. 12(a). Since each of the protrusions 24a has a slanted portion in its one side facing the motor shaft as described already, the protrusion may be easily received in the through hole 18c. Each of the protrusions 24a abuts, at its side opposite to the side having the slanted portion, against a side surface of the corresponding through-hole 18c of the plate 18, as a result of which the plate 18 is positioned accurately with respect to the stator 26. In this state, there is formed a gap between the side surface of the through-hole 18c and the side surface of the protrusion 24a having the slanted portion. A tip end portion of the protrution 24a protruded downwardly of the through-hole 18c will be pressed by a lower end plate 16 to be deformed, as shown in FIG. 12(b), when the end plate 16 is joined to the side plate 12 through spot welding treatment as will be described later. Therefore, the plate 18 can be fixedly secured to the stator 26, after the spot welding treatment.

The stator 26 is then surrounded by the side plate 12. The upper and bottom end plates 14 and 16 are placed on the upper and lower end surfaces of the side plate 12.

Figure 6:
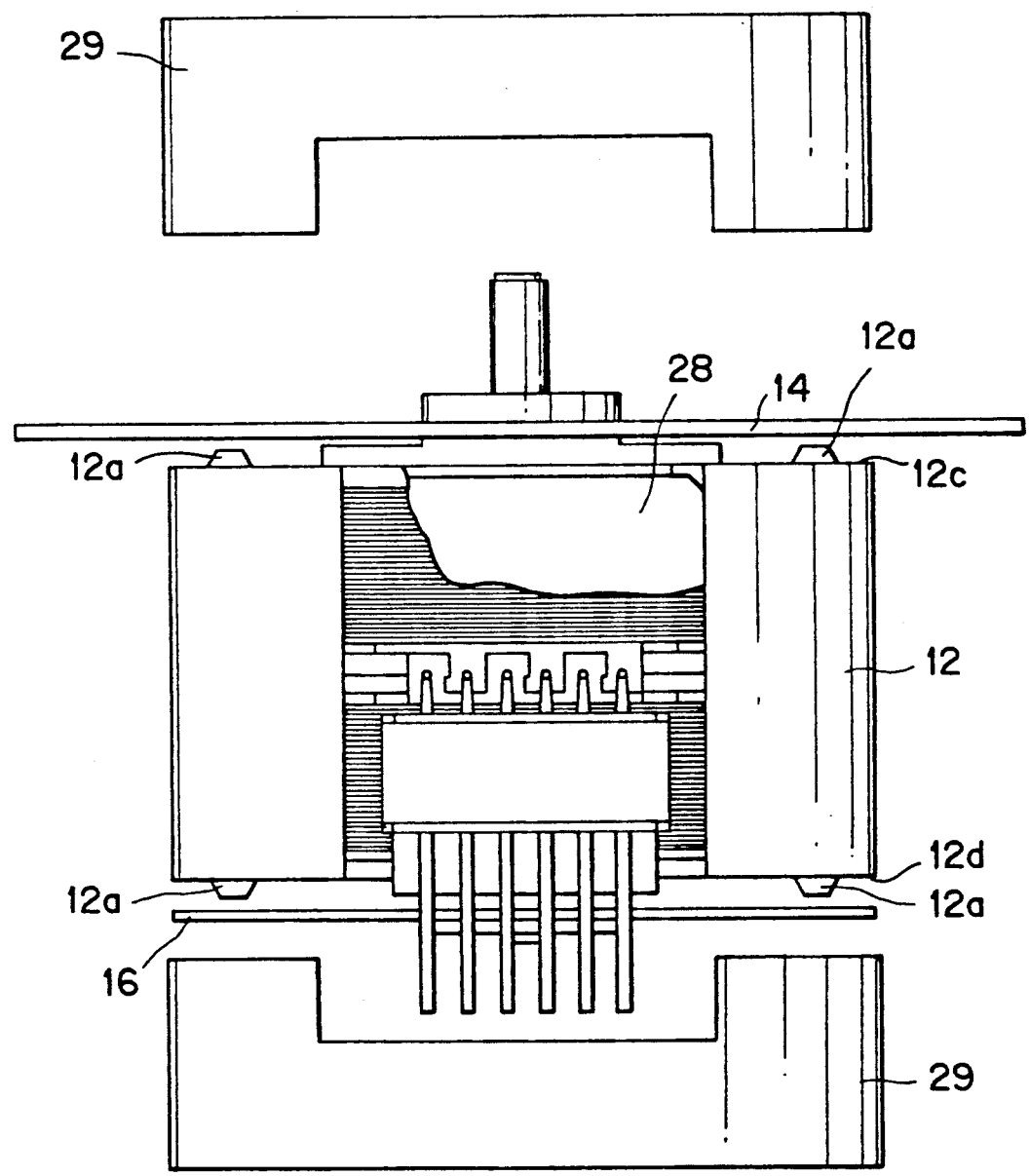

On each of the upper and bottom end side surfaces 12c and 12d of the side plate 12, as shown in FIG. 6, there are formed a plurality of small protrusions 12a at a predetermined interval therebetween. Therefore, the upper and bottom end plates 14 and 16 are placed on the both end sides of the side plate 12 in such a manner that the upper and bottom end plates contact the protrusions 12a.

After when the upper and bottom end plates are thus placed on the side plate 12, the upper end plate 14 is pressed downwardly along the motor shaft by an upper electrode 29, and the bottom end plate 16 is pressed upwardly by a lower electrode 29. Due to the press operation by the both electrodes 29, the small protrusions 12a are deformed so that their heights become two thirds of their original heights, as a result of which the upper electrode 29, the upper end plate 14, the side plate 12, the bottom end plate 16 and the lower electrode 29 are electrically connected with one another.

As described already, as shown in FIG. 2, the upper bearing supporting member 24b has a predetermined amount of thickness, so that a gap G of the predetermined amount is formed between an upper surface of the stator 26 (upper surface of the yoke member 36) and a lower surface of the upper end plate 14 placed on the side plate 12. Therefore, the stator 26 is not in contact with the upper end plate 14. Furthermore, the resin-formed upper bearing supporting member 24b is provided between the upper end plate 14 and the upper bearing 25 contacted with the rotor. Therefore, the rotor 28 is not in contact with the upper end plate 14.

On the other hand, the lower bearing supporting plate 18 has a predetermined thickness, so that there is formed a gap G having the predetermined thickness between a lower surface of the stator (lower surface of the yoke member 42) and an upper surface of the bottom end plate 16. Therefore, the stator 26 is not contact with the bottom end plate 16. Furthermore, the resin-formed lower bearing supporting plate 18 is provided between the bottom end plate 16 and the lower bearing 20 connected with the rotor 28. Therefore, the rotor 28 is not in contact with the bottom end plate 16. Furthermore, there is formed a gap between the outer peripheral surface of the stator 26 and the inner peripheral surface of the side plate 12. As apparent from the above, the stator 26 and the rotor 28 are electrically insulated from the side plate 12 and the end plates 14 and 16.

Then, electric voltage is applied between the electrodes 29 and 29, so that electric current flows between the both electrodes 29 through the both end plates 14 and 16 and the side plate 12. As a result, spot welding action is performed at the small protrusions 12 where the end plates 14 and 16 contact the side plate 12. According to the invention, since the stator and the rotor are electrically insulated from the end plates and the side plate as described above, it is possible to prevent the electric current flowing toward the stator or the rotor. That is, the electric current generated in one electrode 29 flows only through the end plates and the side plate toward the other electrode. Therefore, it is possible to prevent amount of electric current flowing through the protrusions 12a from being erroneously reduced. As a result, sufficient amount of heat is certainly generated at the protrusions 12a, so that the spot welding action at the protrusions is suitably performed. Strength of the thus manufactured motor can be made very high and can be maintained to be high for a long time.

Furthermore, the central hollow portion 26a of the stator 26 is completely closed with both the upper and lower bearing supporting members 24b and 18. Therefore, even if metal particles or metal oxide particles fly out of the protrusions 12a while the spot welding action is being performed, it is possible to prevent the particles from entering into the central hollow portion 26a. According to the invention, it is possible to avoid the possible lowering of motor performance due to the entered particles, as follows. That is, in the case where such particles enter the central hollow portion 26a of the stator 26, the particles will unbalance the magnetic force generated between the rotor and the stator, or will electrically connect the rotor with the stator, as a result of which the motor performance will be degraded.

After when the end plates 14 and 16 are joined to the side plate 12 through the above-described spot welding operation, the housing connector 22 is connected to the terminal holder 52 of the stator 26, as will be described below.

As shown in FIGS. 2 and 3, the housing connector 22 used in the invention is of a type used for various purposes. The housing connector 22 has one surface connectable with a post connector 80 and the other surface on which there are protruded six connector pins 22a. The connector pins 22a are bent at approximately right angle to have their tip end portions directed in one direction.

When the housing connector 22 is to be mounted in the motor 1, the housing connector 22 is moved in a direction along an arrow B shown in FIG. 2 from the lower side of the motor so that the connector 22 may be inserted into the rectangular parallelpiped portion 18a through its lower end opening to be moved along the four walls of the portion 18a. The connector 22 is thus inserted into the rectangular parallelpiped hollow portion 18a formed on the lower bearing supporting plate 18 in such a manner that the tip ends of the connector pins 22a are directed outside of the motor. The housing connector 22 is retained in the retaining portion 18a such that the connector pins 22a confront or preferably contact the terminal pins 54 provided on the terminal holders 52. The retaining portion 18a prevents the housing connector 22 from being moved in circumferential and radial directions of the cylindrical-shaped stator 26. With such a condition as preventing the movement of the housing connector relative to the stator, the connector pins 22a and the terminal pins 54 are connected with each other through soldering performance.

According to the invention, since the terminal pins 54 are arranged on one line as described already, the soldering operation for connecting the connector pins 22a with the terminal pins 54 can be easily achieved. Therefore, the soldering operation can be achieved by a processing robot machine of a type which is to be used for various purposes or by a soldering processing machine of a type which is especially suitable for the above-described soldering process.

Then, as shown in FIG. 2, the cover member 68 is provided on the front side of the motor 1, so that the portion where the connector pins 22a and the terminal pins 54 are connected with each other is covered with the cover member 68. As a result, the cover member 68 and the front wall of the rectangular parallelpiped portion 18a cover almost all the opening defined between both end sides 12b and 12b of the side plate 12 shown in FIG. 3.

The shape of the cover member 68 will be described below.

Figure 14A:
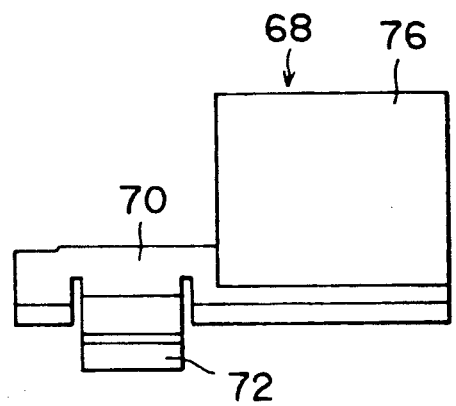
FIGS. 14(a) and 14(b) show the shape of a cover member, FIG. 14(a) being a side view of the cover member and FIG. 14(b) being a cross-sectional plan view taken along a plane perpendicular to the motor shaft.
Figure 14B:
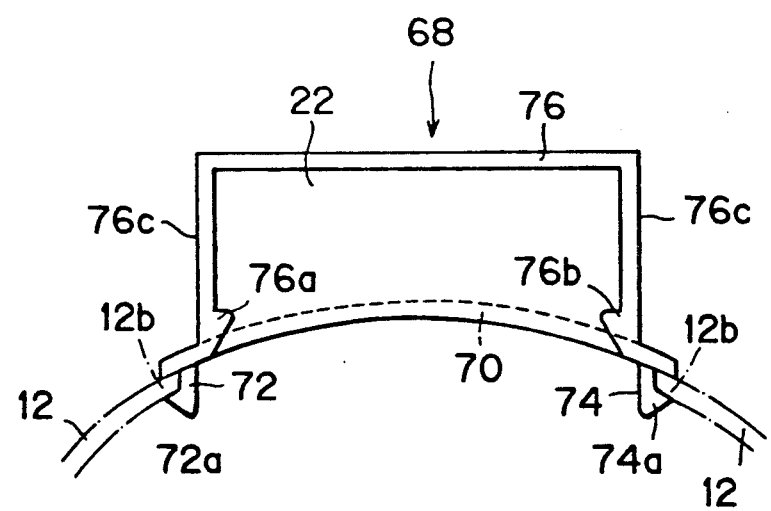

As shown in FIG. 14(a), the cover member 68 includes a circular arc portion 70 with its diameter almost equal to that of the C-shaped cross section of the side flame 12. The circular arc portion 70 covers the opening difined between both end sides 12b and 12b of the side plate 12, at its upper side near to the upper end plate 14. Protrusions 72 and 74 are formed on the circular arc portion 70 at both sides to extend inwardly of the motor, as shown in FIG. 14(b). The protrusions 72 and 74 are formed with hook portions 72a and 74a, at their tip end portions. The hook portions 72a and 74a are engageable with both the end side portions 12b and 12b of the side plate 12.

The cover member 68 further includes a rectangular portion 76 in the lower portion of its circular arc portion 70. The rectangular portion 76 has an opening at its side facing downwardly to thereby receive therein the housing connector 22 retained in the retaining portion 18a.

The rectangular poriton 76 has a pair of side walls 76c provided with hook portions 76a and 76b. The rectangular portion 76 has therein a rectangular hollow portion with such a shape as suitable for receiving the housing connector 22. The hook portions 76a and 76b are engaged with a surface of the housing connector 22 facing the stator 26 at its part 22b which is not contacted with inner side wall of the rectangular parallelpiped portion 18a, as shown in FIG. 2. As a result, the housing connector 22 is held not only by the retaining portion 18a of the plate 18 but also by the rectangular portion 76 of the cover member 68.

The rectangular portion 76 contacts, at its lower end portion, the upper end portion of the outer side wall of the retaining portion 18a, as shown in FIG. 2, so that almost entire portion of the opening defined between the both end sides 12b and 12b of the side plate 12 is covered by the cover member 68 and the wall of the retaining portion 18a.

The cover member 68 is mounted on the motor, as will be described below.

The cover member 68 is pressed toward the opening defined between the both end sides 12b and 12b of the side plate 12. The hook portions 72a, 74a, 76a and 76b are elastically deformed, so that the hook portions 76a and 76b engage with the surface portion 22b of the housing connector 22 and the hook portions 72a and 74a engage with both the end sides 12b and 12b of the side plate 12. The cover member is thus fixedly mounted on the motor 1 through the engagement of the hook portions 72a and 74a with the plate 12 and the engagement of the hook portions 76a and 76b with the housing connector 22 retained by the lower bearing supporting plate 18. The hook portions 76a and 76b also serve as means for preventing the rectangular portion 76 from being elastically deformed to be moved away from the motor when the circular arc portion 70 of the cover member 68 is pressed toward the motor.

Then, the post connector 80 is connected to the housing connector 22 retained in the motor 1. The post connector 80 has lead wires 78 which are connectable to external electrodes or power souce.

The post connector 80 is manufactured separately from the motor 1. For one single motor 1 of the present invention, it is possible to manufacture the post connectors 80 of various types which have lead wires 78 with their lengths being different from one another. In this case, the motor 1 can be used for a plurality of purposes, by connecting the motor with the thus manufactured various types of post connectors 80.

The motor 1 of the present invention may be sold in such a state that the post connector 80 is not yet connected to the motor 1. In this case, an user having bought the motor 1 needs to buy or produce the post connector 80 by himself. The motor 1 may be sold also in such a state that the post connector 80 is connected to the motor. In this case, adhesive agent may be provided at a portion where the post connector is connected to the housing connector so that they may not be separated from each other. In this case, the post connector 80 having the lead wires are connected to the motor after when all the other steps of procedures for producing the motor are completed. Therefore, it becomes possible to prevent the lead wires already connected to the motor from bothering other steps of procedures for producing the motor.

The stepping motor of the present invention manufactured as described above operates, as follows.

Driving pulse signals are applied from the external electrodes to the lead wires 78 of the post connector 80 which is connected through the housing connector 22 to the terminal connector pins 54. Since the terminal connector pins 54 are connected to the wirings 48c and 50c wound around the coil bobbins 48 and 50 of the stator 26, electric current flows in the wirings of the coils of the stator, and therefore magnetic forces are generated. As a result, the the rotor 28 having the permanent magnet 32 is rotated.

A second embodiment of the present invention will be described below with referring to FIG. 18.

The method of manufacturing a stepping motor according to the second embodiment of the present invention is the same as that of the first embodiment of the present invention, without its step of procedure for uniting integrally the yoke members and the coils into the stator. According to the second embodiment, the stator 26 is not produced through the resin injection molding treatment as used in the first embodiment.

Figure 18:
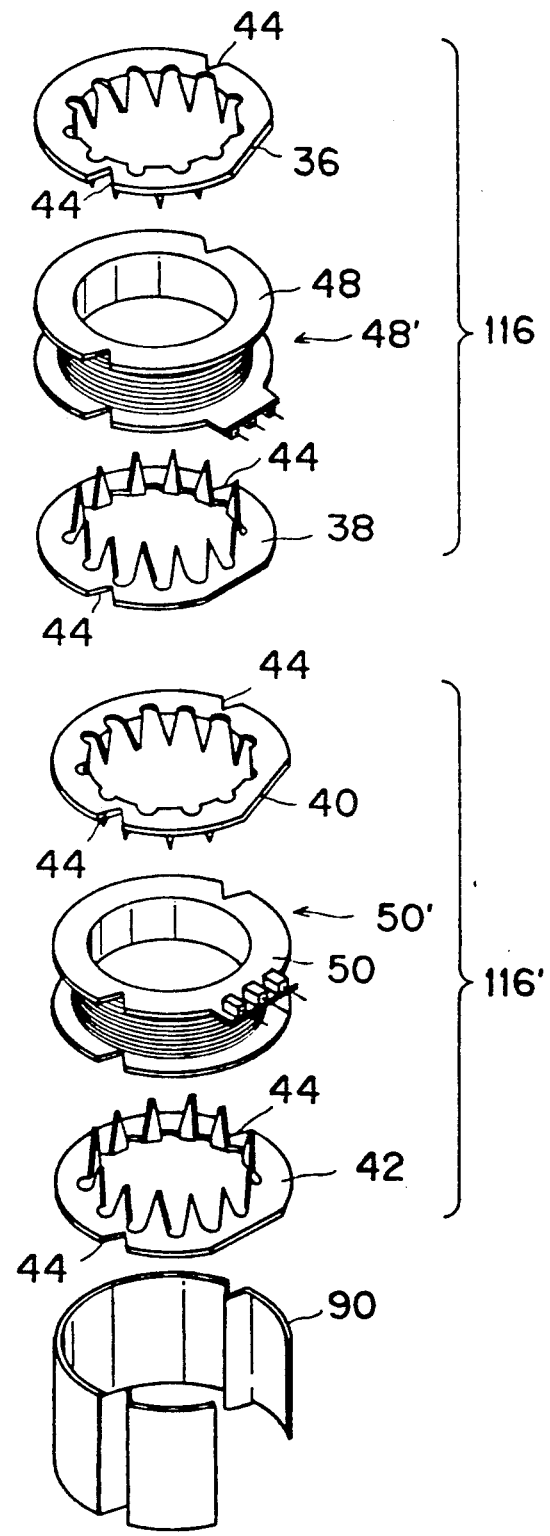
FIG. 18 is a perspective view illustrating the manner how the coil members and yoke members are assembled into the stator without using resin, according to a second embodiment.

According to the second embodiment, as shown in FIG. 18, a side cover member 90 is used for producing the stator 26. The side cover member 90 has a pair of V-shaped protruded portions. The single unit members 116 and 116' are mounted inside of the side cover member 90, with their V-shaped cut portions 44, 48a and 50a receiving the V-shaped protruded portions of the side cover member. Thus, the single unit members are accurately positioned in their axial and circumferential directions. The single unit members thus mounted in the side cover member are compressed along their axial direction, by the use of pressing means such as screw members. As a result, the flange portions of the coils are elastically deformed due to the ununiformity of the stress occurred inside the coils, so that the hook portions c formed on the protrusions 48b and 50b engage with each other. Thus, the single unit members 116 and 116' are assembled into the single stator 26.

A third embodiment of the present invention will be described below.

The method of manufacturing the stepping motor of the third embodiment is the same as that of the first embodiment, without the following point. That is, according to the third embodiment, such coil bobbins 48 and 50 as used in the first and second embodiments are not used.

According to the third embodiment, two ring-shaped molds are used, together with the bottom mold 58 and the upper mold 64 shown in FIG. 10. In this case, only the two pairs of yoke members are mounted between the molds 58 and 64, one pair sandwiching one ring-shaped mold and the other pair sandwiching the other ring-shaped mold. Then, hard resin is injected into a space formed between the molds, so that the yoke members are integrally united with one another through the hardened resin to form the stator 26. Thus formed stator 26 has two ring-shaped grooves corresponding to the ring-shaped molds, each groove being formed between each pair of yoke members. Wirings are provided in the grooves, so that the stator 26 is completely produced. In this embodiment, the step portions 46a are formed on the teeth-shaped magnetic poles of the yoke members, too. Therefore, the hardened resin covers the stepped portions, so that the stator magnetic poles are certainly prevented from being stretched out at their bent portions.

A fourth embodiment of the present invention will be described below.

The stepping motor of the fourth embodiment is the same as that of the first embodiment, without the following point. That is, though the retaining portion 18a for retaining the housing connector 22 is formed integrally with the lower bearing supporting plate 18 in the first embodiment, the connector retaining portion 16'c is formed on the bottom end plate 16' in the fourth embodiment.

Figure 19:
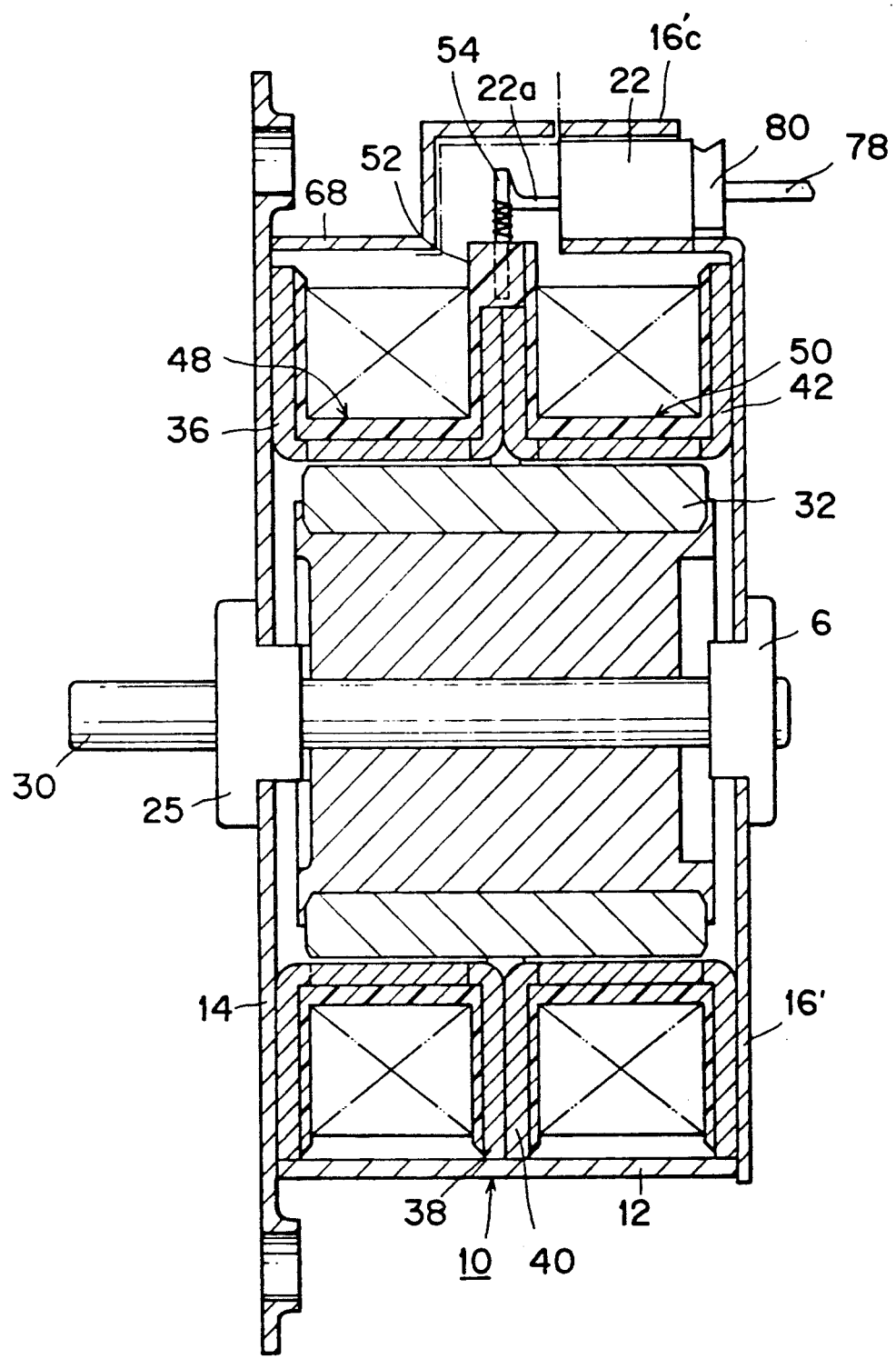
Figure 20:
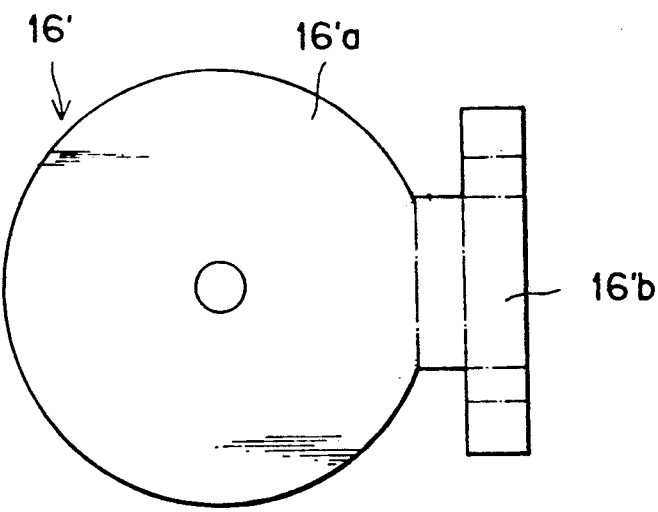
Figure 21:
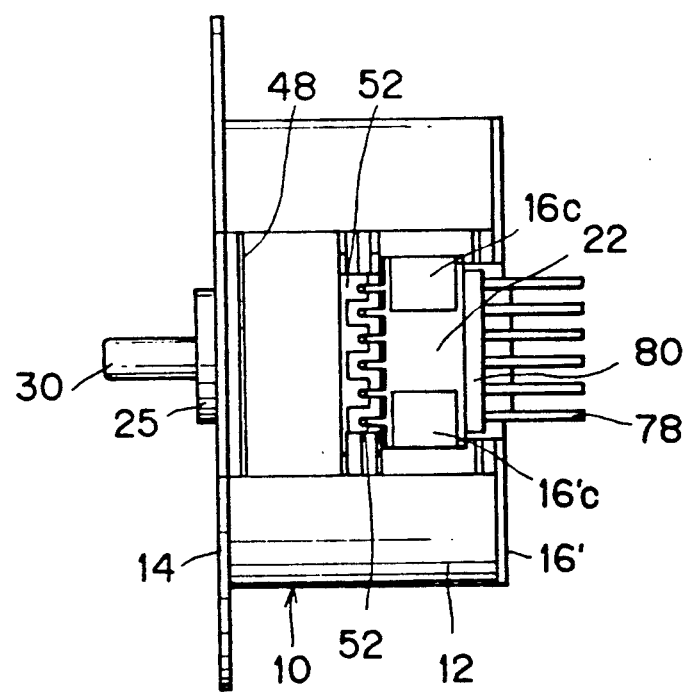

As shown in FIGS. 19 through 21, such the bottom end plate 16' is formed from a plate which has been produced through press treatment to have a circular portion 16'a and a rectangular portion 16'b, as shown in FIG. 20. The rectangular portion 16'b is bent at its one-dot-one-chain line shown in the figure, so that the retaining portion 16'c is formed. Such the connector retaining portion 16'c will serve as means for retaining the housing connector 22 to prevent the pins 22a from being moved relative to the terminal pins 54 during the soldering operation. Furthermore, as shown in FIGS. 19 and 21, in this embodiment, the plate 18 may be neglected from the motor, if the lower bearing 20 is supported by the end plate 16'. Similarly, if the upper bearing 25 is supported by the end plate 14, the upper bearing supporting plate 24b may be neglected from the motor.

As apparent from the above description, according to the method of manufacturing the stepping motor of the present invention, the positional accuracy of the coils and the yoke members constituting the stator depends only on the accuracy of the shape of the mold. Therefore, by simply increasing the precision of the shape of the mold, it is possible to increase the positional accuracy of the members constituting the stator. The procedure of producing the stator with thus increased accuracy can be conducted much easier, in comparison with the case where the members are assembled manually into the stator. Furthermore, the precision of the shapes of the members per se is not required to be increased so much. As apparent from the above, according to the present invention, the possibility of erroneously producing a stator with low accuracy can be lowered, but it becomes possible to provide a high quality stepping motor with a cheep price.

According to the present invention, furthermore, since the housing connector is used in the present invention, it becomes possible to connect the motor with the lead wires much easily, and therefore the number of the steps of procedure for connecting the motor with the lead wires can be much decreased. Furthermore, the procedure for connecting the housing connector with the motor is conducted while the housing connector is retained in the retaining portion to thereby be prevented from being moved relative to the motor. Therefore, the procedure can be easily conducted, by the use of a machine of a type which is exclusively used for the procedure or by the use of a processing robot machine of a type which is to be used for not only the procedure but also various purposes.

In addition, in the step of procedure for producing the stator, it becomes possible to certainly arrange in one line the terminal pins of the stator with which the connector pins of the housing connector are to be connected. Therefore, the housing connector pins can be automatically connected to the terminal pins very easily. Even if an user does not use the housing connector but connects lead wires directly to the motor by himself, the lead wires can be easily connected with the terminal pins. In this case, the terminal pins arranged in in-line cannot deteriorate the view of the motor when the cover member 68 is taken off.

According to the invention, the teeth-shaped magnetic poles of the stator have stepped portions on which the hard resin is provided. Therefore, the teeth portions are prevented from being stretched out at their bent portions, due to residual stress, shrink or swell of the hard resin, or impact from outside. As a result, the balance of the magnetic force formed between the stator and the rotor is not damaged, and therefore the motor is controlled stably and accurately. Furthermore, since the teeth portions cannot be contacted with the rotor, the rotor can be reliably rotated.

According to the invention, there is formed a gap of a predetermined amount between the stator and the upper and bottom end plates, when the end plates are to be joined, through spot welding performance, to the side plate covering the stator. The stator can be electrically insulated from the end plates. Therefore, sufficient amount of electric current can flow into the portion where the spot welding performance is achieved. As a result, desirable spot welding performance can be achieved for fixedly securing the end plates to the side plate.

Although certain perffered embodiments have been shown and described, it should be understood that many changes and modifications may be made therein without departing from the scope of the appended claims.

For example, in the above-described embodiments, the stator 26 is secured to the lower bearing supporting plate 18 when the bottom end plate 16 is joined to the side plate 12 through the spot welding performance. In other words, the stator 26 is secured to the plate 18 when the bottom end plate 16 is pressed toward the side plate 12 to thereby deform the protrusions 24a of the stator 26 which are engaged in the through-holes 18c of the plate 18. However, only the protrusions 24a may be first pressed to be deformed so that the plate 18 may be fixedly secured to the stator 26. Then, the end plate 16 may be pressed toward the side plate 12 so that the end plate 16 may be joined to the side plate 12.

Furthermore, though both the end plates 14 and 16 are fixedly secured to the side plate 12 through the spot welding performance in the above-described embodiments, only one of the end plates may be secured to the motor through the spot welding performance, but the other remaining one end plate may be secured to the side plate through another fixing manner. Or, the remaining one end plate may be previously produced integrally with the side plate.

What is claimed is:

1. A method of manufacturing a stator member for a stepping motor, comprising the steps of:
    placing a coil member on a mold, the coil member having a central shaft portion and a pair of flange portions extending from both ends of the central shaft portion, the coil member having wirings wound around the central shaft portion between the pair of flange portions, the central shaft member having an inner peripheral wall defining a cylindrical hollow portion;

placing at least one yoke member on a mold, the yoke member including an annular base plate portion and a plurality of teeth-shaped magnetic pole portions extending upright from the base plate portion, the teeth portions being inserted into the cylindrical hollow portion of the coil member from its one end, one surface of each of the teeth portions facing the mold being in contact with a surface of the mold;

pressing the yoke member and the coil member toward each other in a direction along the central shaft portion of the coil member so that the base plate portion of the yoke member may be brought into contact with one flange portion of the coil member; and providing hardenable material in a space enclosed by the surface of the mold and surfaces of the pressed together coil member and the yoke member, to thereby integrally unite the coil member and the yoke member into one stator member.

2. A method of manufacturing a stator member for a stepping motor as claimed in claim 1, wherein the mold includes a columnar-shaped mold, the coil member being mounted on the mold such that the columnar mold is inserted into the cylindrical hollow portion, the yoke member being mounted on the mold such that the columnar mold is inserted into the annular base plate portion, the diameter of a circular cross section of the columnar mold being equal to that of a circle formed by the surfaces of the teeth portions facing the columnar mold, the hardenable material being provided in a space enclosed by a surface of the columnar mold and the surfaces of the pressed coil member and yoke member.

3. A method of manufacturing a stator member for a stepping motor as claimed in claim 2, wherein a pair of yoke members are mounted on the mold in such a manner that teeth portions of the yoke members are inserted into a cylindrical hollow portion of the central shaft portion of the coil member from both ends thereof, the teeth portions of the pair of yoke members being arranged along the inner peripheral wall of the coil member such that each two adjacent teeth portions of selected one of the pair of yoke members sandwich each corresponding one tooth portion of the other one of the pair of yoke members.

4. A method of manufacturing a stator member for a stepping motor as claimed in claim 2, wherein the coil member includes an annular groove having a U-shaped cross section which is formed by an outer peripheral wall of the central shaft portion and the pair of flange portions, the wirings being provided in the U-shaped groove.

5. A method of manufacturing a stator member for a stepping motor as claimed in claim 2, wherein each of the teeth portions of the yoke member includes a stepped portion having a surface which faces the surface of the mold but is spaced apart therefrom whereby to provide a space for receiving the hardenable material thereon.

6. A method of manufacturing a stator member for a stepping motor as claimed in claim 5, wherein the stepped portion of each tooth portion with its surface being positioned apart from the surface of the mold is provided at a tip end of each tooth portion.

7. A method of manufacturing a stator member for a stepping motor as claimed in claim 6, further comprising the step of placing a first bearing member for rotatably supporting a rotor shaft on the mold at a position on a first side of the mounted coil member so that a first bearing supporting member may be formed from the hardenable material integrally with the stator member.

8. A method of manufacturing a stator member for a stepping motor as claimed in claim 7, wherein the mold includes a recess formed at a position on a second side of the mounted coil member so that the stator member may have a protrusion formed of the hardened material, and further comprising a step of mounting a second bearing supporting plate onto the stator member, the second bearing supporting plate being formed with a through hole, said step comprising the steps of: inserting the protrusion of the stator member into the through-hole formed in the bearing supporting member; and deforming the protrusion so that the protrusion may be fixedly engaged with the second bearing supporting member.

9. A method of manufacturing a stator member for a stepping motor, comprising the steps of:

placing two pairs of yoke members on two coil members in such a manner that teeth portions of each pair of the yoke members are inserted into a cylindrical hollow portion of a central shaft portion of each of the coil members from both ends thereof, each of the coil members having the central shaft portion and a pair of flange portions extending from both ends of the central shaft portion, each of the coil members having wirings wound around the central shaft portion between the pair of flange portions, the central shaft portion having an inner peripheral wall defining the cylindrical hollow portion, each one of the pairs of yoke members including an annular base plate portion and a plurality of teeth-shaped magnetic pole portions extending upright from the base plate portion, the teeth portions of each one pair of the yoke members being arranged along the inner peripheral wall of corresponding one coil member such that each two adjacent teeth, portions of selected one of the pair of yoke members sandwich each corresponding one tooth portion of the other one of the pair of yoke members;

placing on a mold the coil members on which the pairs of yoke members are thus mounted in such a manner that the coil members are stacked one on the other in a direction along the central shaft portions thereof, one surface of each of the teeth portions of the yoke members facing the mold being in contact with a surface of the mold;

compressing the thus stacked members in a direction along the central shaft members of the coil members so that the base plate portions of the yoke members may be brought into contact with both the flange portions of the coil member on which the yoke members are mounted and the flange portions of the coil members facing each other may be brought into contact with each other; and providing hardenable material in a space enclosed by the surface of the mold and surfaces of the pressed together coil members and the yoke members, to thereby integrally uniting the coil members and the yoke members into one stator member.

10. A method of manufacturing a stator member for a stepping motor as claimed in claim 9, wherein the mold includes a columnar-shaped mold, the coil members on which the pairs of yoke members are mounted being mounted on the mold such that the columnar mold is inserted into the cylindrical hollow portions of the coil members and the annular base plate portions of the yoke members, the diameter of a circular cross section of the columnar mold being equal to that of a circle formed by the surfaces of the teeth portions facing the columnar mold, the hardenable material being provided in a space enclosed by a surface of the columnar mold and the surfaces of the compressed coil members and yoke members.

11. A stator for a stepping motor, comprising:
a coil member having a central shaft portion having an axis and a pair of flange portions extending from both ends of the central shaft portion, said coil member having wirings wound around the central shaft portion between the pair of flange portions, the central shaft portion having an inner peripheral wall defining a cylindrical hollow portion;
a pair of yoke members, each of said yoke members including an annular base plate portion and a plurality of teeth-shaped magnetic pole portions extending upright from the base plate portion, the teeth portions being inserted into the hollow portion of the central shaft of said coil member from its both ends to thereby extend along the inner peripheral wall thereof, the base plate portions being in contact with the flange portions of said coil member, the teeth portions of said pair of yoke members being arranged along the inner peripheral wall of said coil member such that each two adjacent teeth portions of selected one of said pair of yoke members, sandwich each corresponding one tooth portion of the other one of said pair of yoke members; and
a hardened material structure filled in a space formed by a cylindrical surface defined by surfaces of the teeth portions facing the axis of said coil member and surfaces of said coil member and said yoke members.

12. A stator for a stepping motor as claimed in claim 11, wherein the space enclosed by the cylindrical surface defined by the surfaces of the teeth portions facing the axis of said coil member and the surfaces of said coil member and said yoke members is formed through pressing the yoke member and the coil member toward each other in a direction along the central shaft portion of the coil member so that the base plate portion of the yoke member may be brought into contact with one flange portion of the coil member.

13. A stator for a stepping motor as claimed in claim 12, wherein each of said coil members includes an annular groove having an U-shaped cross section which is formed by an outer peripheral wall of the central shaft portion and the pair of flange portions, the wirings being provided in the U-shaped groove.

14. A stator for a stepping motor as claimed in claim 12, wherein each of the teeth portions includes a stepped portion with its surface facing the axis of said coil member, said stepped portion being covered with the hardened material.

15. A stator for a stepping motor as claimed in claim 14, wherein the stepped portion is formed at a tip end portion of each of the teeth portions.

16. A stator for a stepping motor as claimed in claim 15, further comprising a first bearing supporting member formed on a first side of said coil member and formed integrally with said hardened material structure.

17. A stator for a stepping motor as claimed in claim 16, further comprirising:
a hardened material protrusion formed integrally with the hardened material structure on a second side of the coil member; and
second bearing supporting member provided with a through-hole, said protrusion passing through the through-hole and being deformed to hold the second bearing supporting member on said second side of the coil member.

18. A stator for a stepping motor, comprising:
two coil members, each having a central shaft portion having an axis and a pair of flange portions extending from both ends of the central shaft portion, each of said coil members having wirings wound around the central shaft portion between the pair of flange portions, the central shaft portion having an inner peripheral wall defining a cylindrical hollow portion, said two coil members being stacked one on the other in a direction along their axes;
two pairs of yoke members, each of said including an annular base plate portion and a plurality of teeth-shaped magnetic pole portions extending upright from the base plate portion, one pair of said yoke members being mounted on one of said coil members and the other pair of yoke members being mounted on the other one of said coil members in such a manner that the teeth portions of each one pair of said yoke members are inserted into the hollow portion of the central shaft of corresponding one of said coil members from its both ends to thereby extend along its inner peripheral wall and the base plate portions of each one pair of said yoke members are in contact with the flange portions of corresponding one of said coil members, the flange portions of said coil members facing each other being in contact with each other, the teeth portions of each one of said pair of yoke members being arranged along the inner peripheral wall of corresponding one of said coil members such that each two adjacent teeth portions of selected one of said each pair of yoke members sandwich each corresponding one tooth portion of the other one of said each pair of yoke members; and
a hardened material structure filled in a space formed by a cylindrical surface defined by surfaces of the teeth portions facing the axis of said coil members and surfaces of said coil members and said yoke members.

19. A stator for stepping motor as claimed in claim 18, wherein the space enclosed by the cylindrical surface defined by the surfaces of the teeth portions facing the axis of said coil members and surfaces of said coil members and said yoke members is formed through compressing the coil members and the yoke members mounted thereon toward one another in a direction along the central shaft members of the coil member so that the base plate portions of the yoke members may be brought into contact with both the flange portions of the coil members on which the yoke members are mounted and the flange portions of the coil members facing each other may be brought into contact with each other.

20. A stator for a stepping motor as claimed in claim 19, wherein said coil members have protrusions on their flange portions facing each other, a terminal pin connected to the wirings wound around the coil member being provided on each of the protrusions, the protrusions being aligned so that the pins on the protrusions are arranged in in-line.

21. A stator for a stepping motor as claimed in claim 20, wherein the protrusions have hook portions engaged with one another.

* * * * *